(12) United States Patent
Bisio

(10) Patent No.: US 10,000,335 B2
(45) Date of Patent: Jun. 19, 2018

(54) CAPSULE FOR PREPARING BEVERAGES

(71) Applicant: Bisio Progetti S.P.A., Alessandria (IT)

(72) Inventor: Stefano Bisio, Alessandria (IT)

(73) Assignee: Bisio Progetti S.P.A., Alessandria (IT)

( * ) Notice: Subject to any disclaimer, the term of this patent is extended or adjusted under 35 U.S.C. 154(b) by 0 days. days.

(21) Appl. No.: 14/435,018

(22) PCT Filed: Oct. 10, 2013

(86) PCT No.: PCT/IT2013/000279
§ 371 (c)(1),
(2) Date: Apr. 10, 2015

(87) PCT Pub. No.: WO2014/061046
PCT Pub. Date: Apr. 24, 2014

(65) Prior Publication Data
US 2015/0274412 A1    Oct. 1, 2015

(30) Foreign Application Priority Data

Oct. 15, 2012 (IT) .............................. TO2012A0899

(51) Int. Cl.
*B65D 85/804* (2006.01)
(52) U.S. Cl.
CPC ..... *B65D 85/8046* (2013.01); *B65D 85/8043* (2013.01)
(58) Field of Classification Search
CPC .................. B65D 85/8043; B65D 85/8046
See application file for complete search history.

(56) References Cited

U.S. PATENT DOCUMENTS

| | | | | |
|---|---|---|---|---|
| 2006/0019000 A1* | 1/2006 | Zanetti | ............... | B65D 85/8043 426/112 |
| 2010/0180775 A1* | 7/2010 | Kollep | ............... | B65D 85/8043 99/295 |
| 2011/0041702 A1* | 2/2011 | Yoakim | ............... | B65D 85/8043 99/302 R |
| 2011/0183043 A1* | 7/2011 | Reati | .................. | B65D 85/8043 426/82 |
| 2011/0186450 A1* | 8/2011 | Bonacci | ................ | A47J 31/369 206/219 |

* cited by examiner

*Primary Examiner* — Michele L Jacobson
*Assistant Examiner* — Ericson M Lachica
(74) *Attorney, Agent, or Firm* — Macheledt Bales LLP; Jennifer L. Bales

(57) ABSTRACT

A capsule (1) for preparing beverages, in particular coffee, is described, comprising a containing body (3) having a first portion (5), the containing body (3) defining an internal volume adapted to contain a substance to be infused, the first portion (5) being composed of: a first perimeter edge (13); a first central portion (17) onto which at least one external pressing force is applied; a first crown portion (19) collapsible towards inside the containing body (3) under the action of the pressing force exerted at least on the first central portion (17) and/or on the first crown portion (19), the first crown portion (19) being interposed between the first perimeter edge (13) and the first central portion (17), the first crown portion (19) being connected on its perimeter to the first perimeter edge (13) by interposing a first bending line (21) and being connected to the first central portion (17) by interposing a second bending line (23).

15 Claims, 22 Drawing Sheets

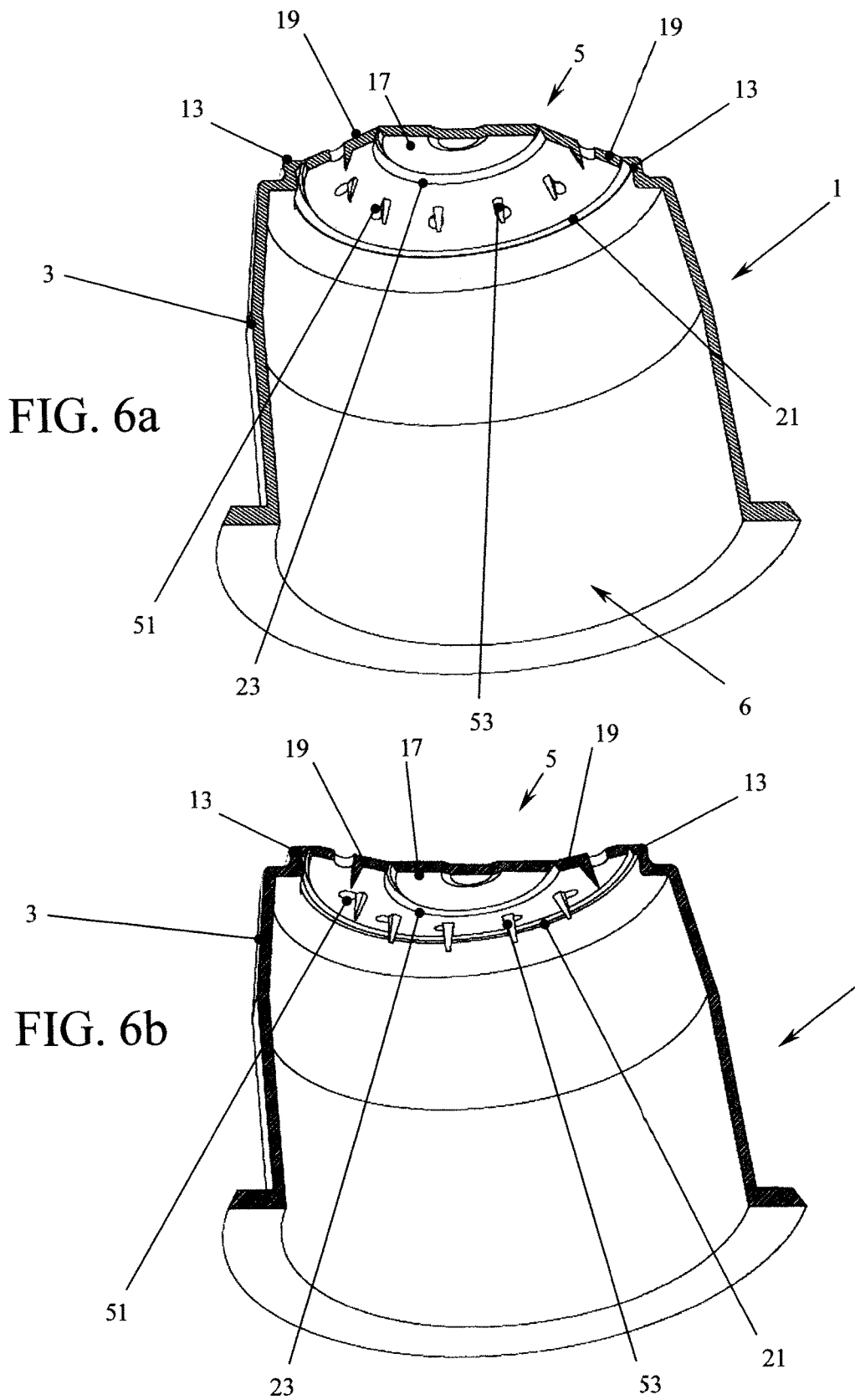

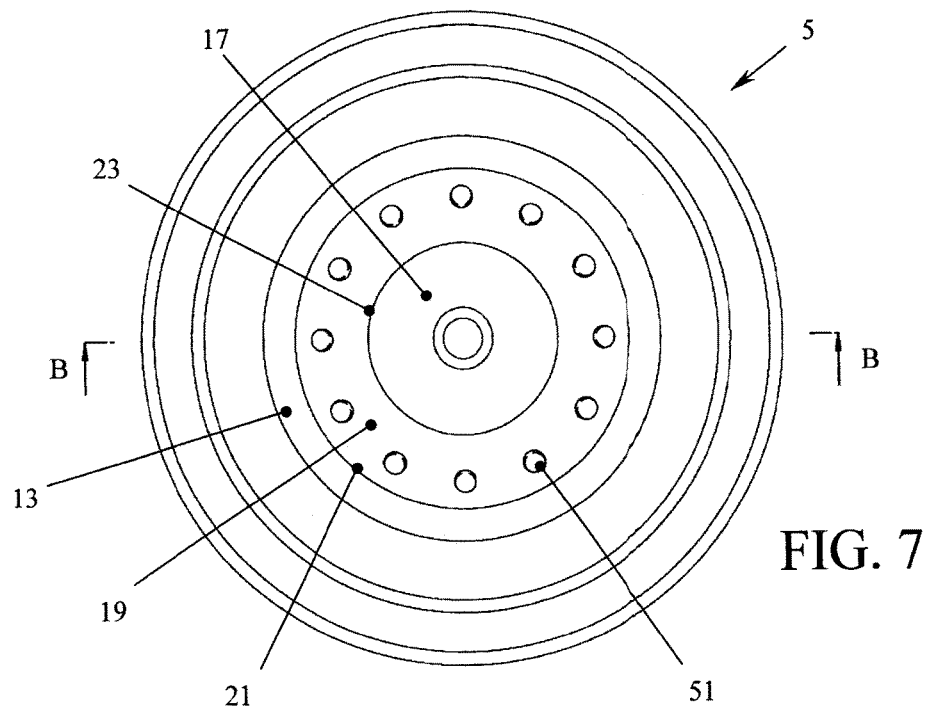
FIG. 7
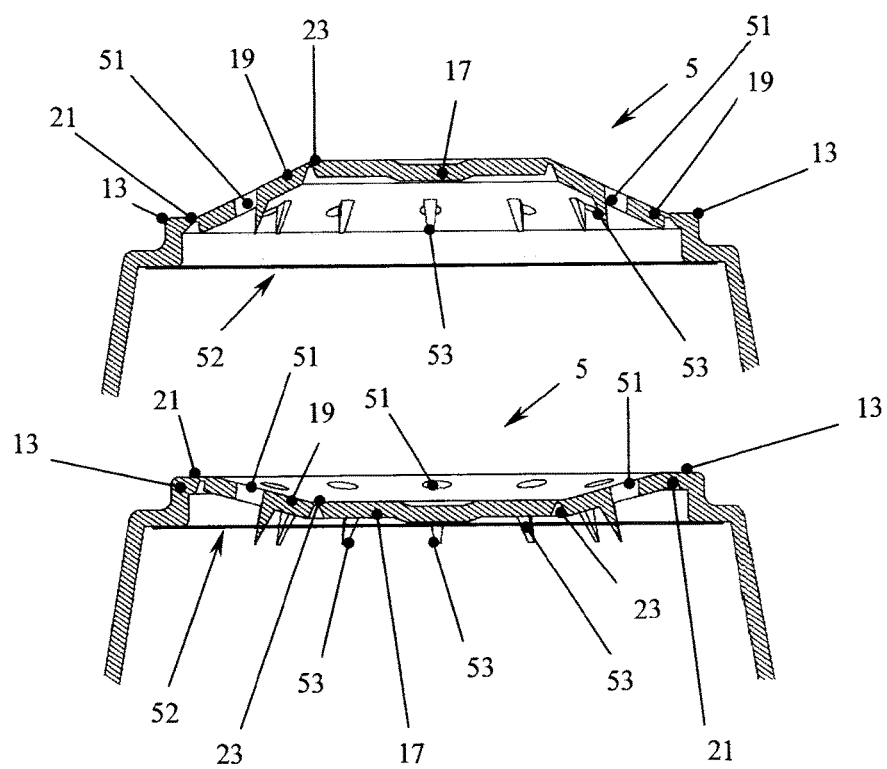
FIG. 8a
FIG. 8b

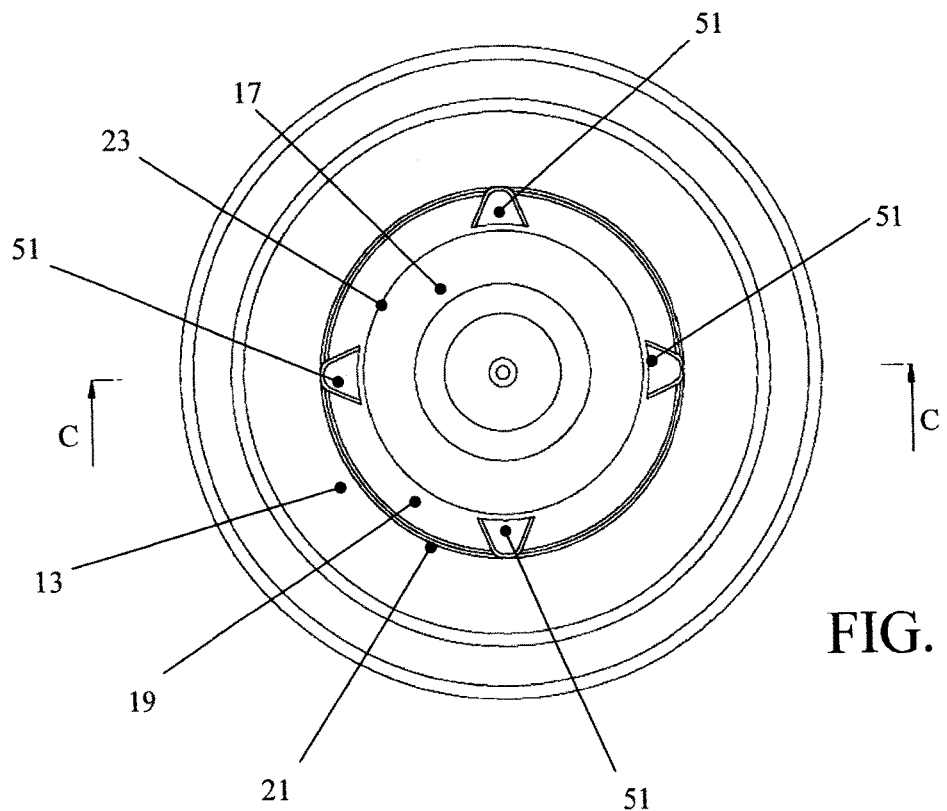
FIG. 11
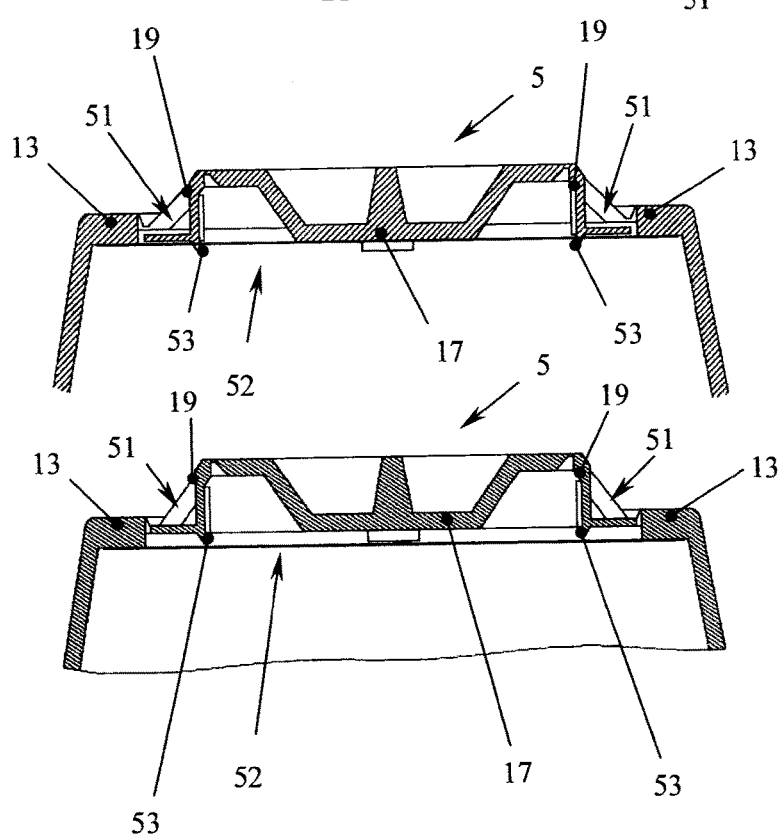
FIG. 12b
FIG. 12a

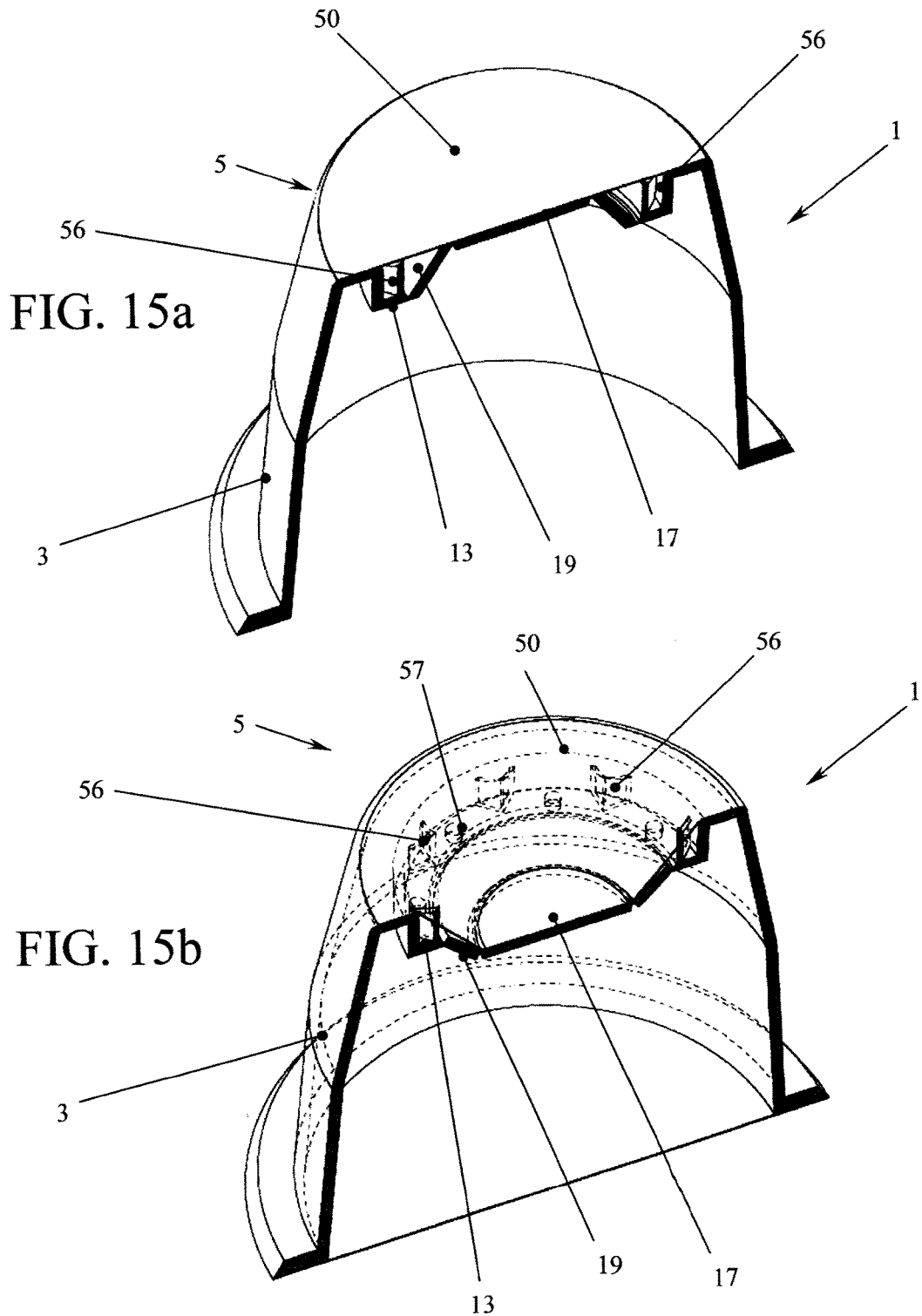

CAPSULE FOR PREPARING BEVERAGES

BACKGROUND OF THE INVENTION

1) Field of the Invention

The present invention refers to a capsule for preparing beverages.

2) Background Art

As known, the art proposes an extreme variety of automatic or semi-automatic machines equipped with a preparing and delivering unit adapted to produce an infusion by passing hot water through a capsule containing the essence to be infused, the as, for example, tea, coffee, tisanes, etc.

In particular, known capsules are with disposable prepackaged doses of the substance to be infused enclosed inside a container made of plastic material closed by a covering made of plastic or an aluminium foil.

Moreover, there are different types of automatic or semi-automatic preparing machines for preparing beverages, in particular of the infusion type, each one of which using a different type of capsule: in general, however, the operating principle common to the machines provides for a perforation of the base and of the covering of the a capsule, thereby allowing a flow of hot water to cross the essence to be infused contained therein, the hot water being delivered by an infusing unit of the machine itself and being output as infusion beverage. Typically, therefore, the machines must be equipped with perforating and/or cutting means, usually integrated in the delivering head of the infusing unit, enough pointed and/or sharpened as to perforate and/or tear the base and the covering of the capsule: obviously, to allow a reliable operation in time of the machines, the perforating and/or cutting means must guarantee their efficiency even after a relevant number of uses; it has however been observed that actually the means, in time, are subjected to wear with chamfering and at the same time to a loss of efficiency in the work of perforation and/or tearing of the capsule, consequently causing a bad operation of the related machine for preparing the infusion beverage.

SUMMARY OF THE INVENTION

Therefore, object of the present invention is solving the above prior art problems by providing a capsule for preparing beverages, in particular coffee, which does not necessarily require the use of a preparing machine equipped with perforating and/or tearing means to allow the water flow to cross the capsule itself.

The above and other objects and advantages of the invention, as will result from the following description, are obtained by a capsule for preparing beverages as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention, as appears from the enclosed claims.

BRIEF DESCRIPTION OF THE DRAWINGS

The present invention will be better described by some preferred embodiments thereof, provided as a non-limiting example, with reference to the enclosed drawings, in which:

FIG. 6a shows a bottom, longitudinally sectioned, perspective view of the capsule of the present invention in the closed operating position of FIG. 5a;

FIG. 6b shows a bottom, longitudinally sectioned, perspective view of the capsule of the present invention in the closed operating position of FIG. 5b;

FIG. 7 shows a bottom plan view of the capsule of the present invention in FIGS. 5a and 5b;

FIG. 8a shows a view along section line B-B of FIG. 7 of the first portion of the capsule of the present invention in a closed operating position;

FIG. 8b shows a vista along section line B-B of the FIG. 7 of the first portion of the capsule of the present invention in a delivering operating position;

FIG. 10 shows a perspective and longitudinally sectioned view of the capsule of the present invention partially disassembled in its closed operating position of FIG. 9a;

FIG. 11 shows a bottom plan view of the capsule of the present invention of FIGS. 9a and 9b;

FIG. 12a shows a view along section line C-C of FIG. 11 of the first portion of the capsule of the present invention in a closed operating position;

FIG. 12b shows a view along section line C-C of FIG. 11 of the first portion of the capsule of the present invention in a delivering operating position;

FIG. 14a shows a perspective and longitudinally sectioned view of the capsule of the present invention in the closed operating position of FIG. 13a;

FIG. 15a shows a perspective and longitudinally sectioned view of the capsule of the FIG. 14a assembled and in the closed operating position;

FIG. 15b shows a perspective and longitudinally sectioned view of the capsule of FIG. 14b assembled and in the delivering operating position;

FIG. 19a shows a perspective and longitudinally sectioned view of the capsule of the present invention in the closed operating position of FIG. 18a;

DETAILED DESCRIPTION OF PREFERRED EMBODIMENTS

Figure 1:
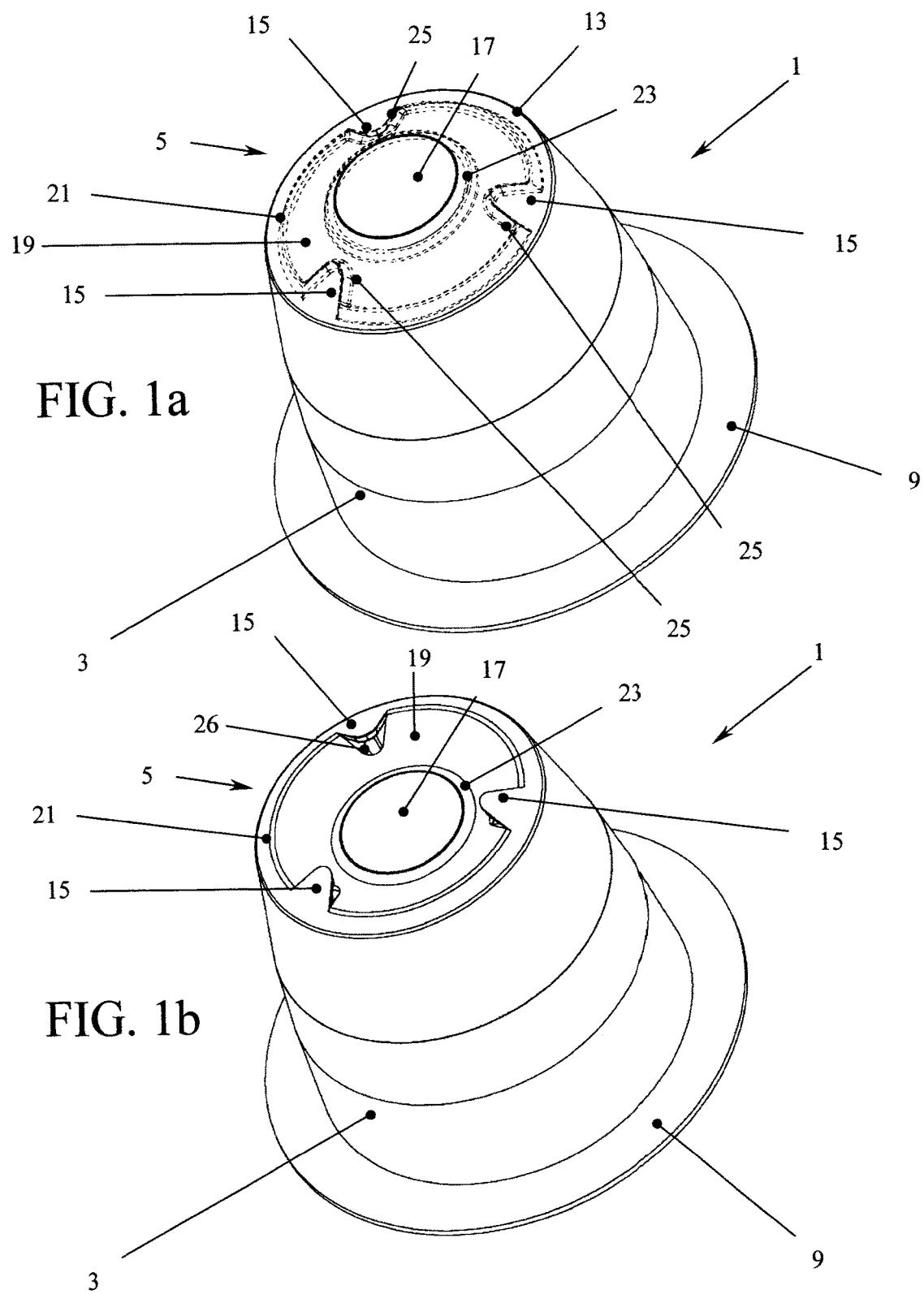
FIG. 1a shows a bottom perspective view of a preferred embodiment of the capsule according to the present invention with its first portion in a closed operating position.
FIG. 1b shows a bottom perspective view of a preferred embodiment of the capsule of the present invention with its first portion in a delivering operating position.
Figure 2:
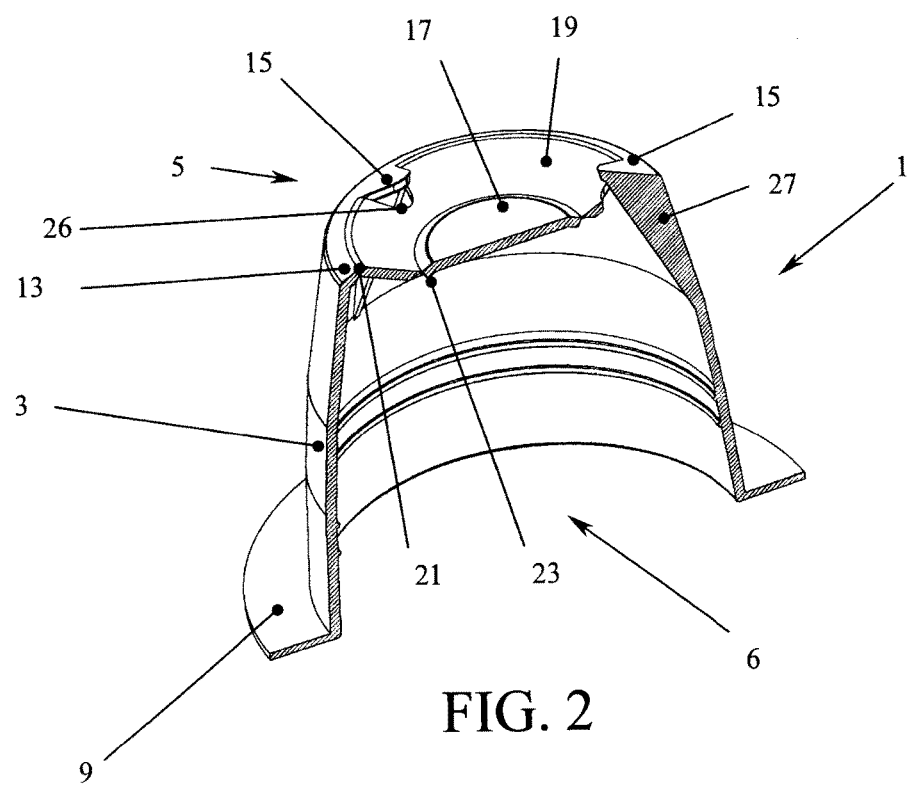
FIG. 2 shows a perspective longitudinally sectioned view of the capsule of FIG. 1b.

With reference to the Figures, it is possible to note that the capsule 1 of the present invention for preparing beverages, in particular coffee through infusion, comprises at least one containing body 3 having at least one first portion 5 for introducing at least one fluid, for example infusion water, inside the containing body 3, the containing body 3 defining at least one internal volume adapted to contain at least one substance for preparing the beverage, typically in granular shape or in powder, to be infused.

Advantageously, the first portion 5 is composed of:
at least one first, substantially rigid perimeter edge 13;
at least one first central portion 17 onto which at least one external pressing force is adapted to be applied, for example by at least one pressing means (not shown) of a prior art preparing machine, inside which the capsule 1 of the present invention is suitably inserted for preparing a beverage; preferably the first central portion 17 is of a circular shape coaxial to the longitudinal axis of symmetry of the containing body 3. Moreover, preferably, the pressing force is exerted from outside onto the first central portion 17 by the pressing means along a substantially parallel direction to the longitudinal axis of symmetry and, still more preferably, substantially coincident with the axis;
at least one first crown portion 19 collapsible towards inside the containing body 3 to create one or more passageways from outside the capsule 1 towards the internal volume through the first portion 5 under the action of the pressing force exerted by the pressing means at least onto the first central portion 17 and/or onto the first crown portion 19, the first crown portion 19 being interposed between the first perimeter edge 13 and the first central portion 17, the first crown portion 19 being connected on its perimeter to the first perimeter edge 13 by interposing at least one first bending line 21 and being connected to the first central portion 17 by interposing at least one second bending line 23.

In one of the preferred embodiments of the capsule 1 according to the present invention, like the one shown in particular in FIGS. 1a to 4b, or 18a to 19b, the first perimeter edge 13 is equipped with one or more first opening profiles 15, these first opening profiles 15 being preferably radially arranged along a circumference coaxial with a longitudinal axis of symmetry of the containing body 3; moreover, each of the first opening profiles 15 is connected to the first crown portion by interposing at least one respective first programmed breaking line 25, at least one of the first programmed breaking lines 25 being adapted to be torn when the pressing force exerted by the pressing means at least onto the first central portion 17 and/or onto the first crown portion 19 reaches a predetermined value, separating at least partially at least one of the first opening profiles 15 from the first crown portion 19.

Therefore, starting from the closed operating position of the first portion 5 of the capsule 1 according to the present invention shown in particular in FIGS. 1, 4a, 18a and 19a, by applying a pressing force through the pressing means of the preparing machine onto the first central portion 17, the first crown portion 19 is brought to collapse inside the volume of the containing body 3 rotating, related to the first perimeter edge 13 and to the first central portion 17, respectively around the first bending line 21 and the second bending line 23, causing the first programmed breaking lines 25 to be torn, and separating the related first opening profiles 15 from the first crown portion 19 and obtaining the passageways through the first portion 5, consequently taking the first portion 5 of the capsule 1 according to the present invention in its delivering operating position, like the one shown for example in particular in FIGS. 1b, 2, 4b, 18b and 19b: in fact, the above separation of the first opening profiles 15 from the first crown portion 19 deriving from the collapsing of the first crown portion 19 towards inside the containing body 3 deriving from the pressing force exerted onto the first central portion 17, creates, between at least one of the first profiles 15 and the first crown portion 19, respective first passage openings 26 which communicate the outside of the capsule 1 with the internal volume of the containing body 3, the first openings 26 consequently enabling the passage of the fluid delivered by the preparing machine in a substantially known way through the internal volume of the containing body 3 itself, and consequently through the substance to be infused contained therein, to go out through the covering, in the modes described below, as infusion beverage.

In addition, as it is possible to note in particular in the embodiment of the capsule 1 according to the present invention shown in particular in FIGS. 18a to 22b, the first portion 5 is covered at least partially and externally by at least one external covering layer 50, made for example as at least one protecting aluminium layer, interposed between the outside of the capsule 1 and at least the first central portion 17 and the first crown portion 19: moreover, at least one of the opening profiles 15 can be equipped with at least one cutting, perforating or breaking profile 54 adapted to perforate and/or tear the external covering layer 50 (as shown, for example, in particular in FIGS. 20b and 22b) when the pressing means of the preparing machine exert the pressing force onto the first central portion 17, obviously by interposing the external covering layer 50, in order to make the passageways through the first portion 5 and take the first portion 5 of the capsule 1 of the present invention to its delivering operating position, like the one for example shown, in particular, in FIGS. 1b, 2, 4b, 18b and 19b, in the above described modes. In fact, the creation, between the first profiles 15 and the first crown portion 19, of the first passage openings 26 and the simultaneous perforation and/or tearing of the external covering layer 50 by the first profiles 54 deriving from the collapse of the first crown portion 19 towards inside the containing body 3, communicates the internal volume of the containing body 3 with outside the capsule 1 through the first passage openings 26 and the tearings/perforations made by the first profiles 54 through the external covering layer 50, to consequently allow the passage of the fluid delivered from the preparing machine in a substantially known way, through the perforations/tearings made by the first profiles 54 through the external covering layer 50, the first passage opening(s) 26, and the internal volume of the containing body 3, and consequently through the substance to be infused contained therein, to go out through the covering, in the below described modes, as infusion beverage.

Preferably, each one of the first opening profiles 15 is supported by a respective stiffening rib 27 adapted to keep the first profile 15 in a substantially fixed position upon applying the pressing force onto the first central portion 17 by the pressing means of the preparing machine and thereby favoring an easier breakage of the first programmed breaking lines 25.

In another of the preferred embodiments of the capsule 1 according to the present invention, like the one shown in particular in FIGS. 5a to 8b or 9a to 12b, the first portion 5 is equipped with one or more second passage openings 51 which communicate the outside of the capsule 1 with the internal volume of the containing body 3, the second passage openings 51 being preferably radially arranged on the first crown portion 19. Moreover, the capsule 1 of the present invention is equipped with at least one first internal covering layer 52, made for example as at least one protecting aluminium layer, interposed between the first portion 5 and the internal volume of the containing body 3, at least the surface of the first crown portion 19 facing the internal volume of the containing body 3, and in particular the first internal covering layer 52, being equipped with one or more first breaking means 53, preferably comprising a plurality of tips (like, for example, in the embodiment of the capsule 1 according to the present invention in FIGS. 5a to 8b) or cutting profiles (like, for example, in the embodiment of the capsule 1 according to the present invention of FIGS. 9a to 12b), each one of the profiles or the tips being arranged next to a related second passage opening 51, the first breaking means 53 being adapted to perforate and/or tear the first internal covering layer 52 when the pressing force exerted by the pressing means at least onto the first central portion 17 and/or onto the first crown portion 19 reaches a predetermined value to make the passageways through the first portion 5 and take the first portion 5 from its closed operating position, like the one shown in FIG. 8a or 12a, towards the delivering operating position, like the one shown in particular in FIG. 8b or 12b, communicating the internal volume of the containing body 3 with outside the capsule 1 through the second passage opening(s) 51 and the perforations/tearings made by the first breaking means 53 through the first internal covering layer 52. Therefore, starting from the closed operating position of the first portion 5 of the capsule 1 according to the present invention shown in particular in FIG. 5a, 6a, 8a or 9a, 10, 12a, by applying a pressing force through the pressing means of the preparing machine at least onto the first central portion 17, the first crown portion 19 is taken to collapse inside the volume of the containing body 3 by rotating, relative to the first perimeter edge 13 and the first central portion 17, respectively around the first bending line 21 and the second bending line 23, taking the first breaking means 53 to penetrate through the first internal covering layer 52, reaching the delivering operating position shown in particular in FIG. 5b, 6b, 8b or 9b, 12b, in order to consequently allow the passage of the fluid delivered by the preparing machine in a substantially known way through the second passage opening(s) 51, the perforations/tearings made by the first breaking means 53 and the internal volume of the containing body 3, and consequently through the substance to be infused contained therein, to go out through the covering, in the below described modes, as infusion beverage.

In another of the preferred embodiments of the capsule 1 according to the present invention, like the one shown in particular in FIGS. 13a to 17b, the first portion 5 is equipped with one or more third passage openings 57, the third passage openings 57 being preferably radially arranged on the first perimeter edge 13; moreover, the first portion 5 is externally covered by the external covering layer 50, interposed between the outside of the capsule 1, the first central portion 17, the first crown portion 19 and the first perimeter edge 13. Moreover, advantageously, the first perimeter edge 13 can be equipped with one or more second cutting, perforating or breaking profiles 56 (arranged, for example, along the first perimeter edge 13 in a position at an interval between the positions of the third passage openings 57), the second profiles 56 being adapted to perforate and/or tear the external covering layer 50 (as shown, for example, in particular in FIGS. 15b and 17b) when the pressing means of the preparing machine exert the pressing force onto the first central portion 17, obviously by interposing the external covering layer 50, to obtain the passageways through the first portion 5 and take the first portion 5 of the capsule 1 according to the present invention to its delivering operating position. In fact, starting from the closed operating position of the first portion 5 of the capsule 1 according to the present invention shown in particular in FIGS. 13a, 14a, 15a and 17a, by applying a pressing force through the pressing means of the preparing machine at least onto the first central portion 17, the first crown portion 19 is taken to collapse inside the volume of the containing body 3, as already previously described, compressing the external covering layer 50 against the second profiles 56, which take care of perforating and/or tearing the layer 50 itself, till the delivering operating position shown in particular in FIGS. 13b, 14b, 15b and 17b is reached, in order to consequently allow the passage of the fluid delivered from the preparing machine in a substantially known way through the perforations/tearings through the external covering layer 50, the third passage openings 57 and the internal volume of the containing body 3, and consequently through the substance to be infused contained therein, to go out through the covering, in the below described modes, as infusion beverage.

Preferably, the first and second bending lines 21, 23, and possibly the first programmed breaking lines 25 are made as striction lines of the material, typically plastics, composing the first portion 5 of the capsule 1 of the present invention.

Figure 31:
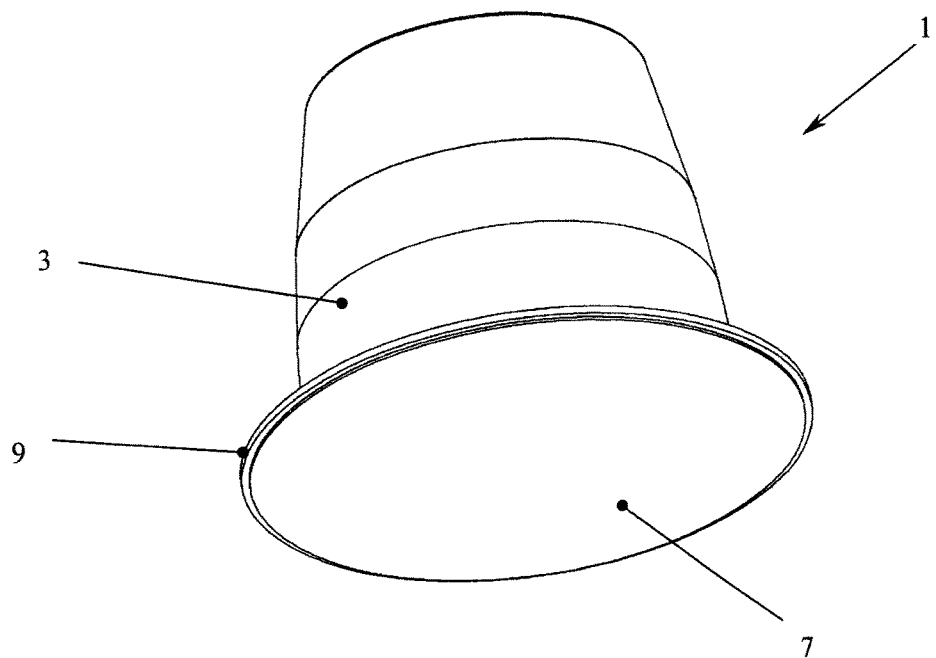
FIG. 31 shows a perspective view of a possible embodiment of the capsule of the present invention.
Figure 3:
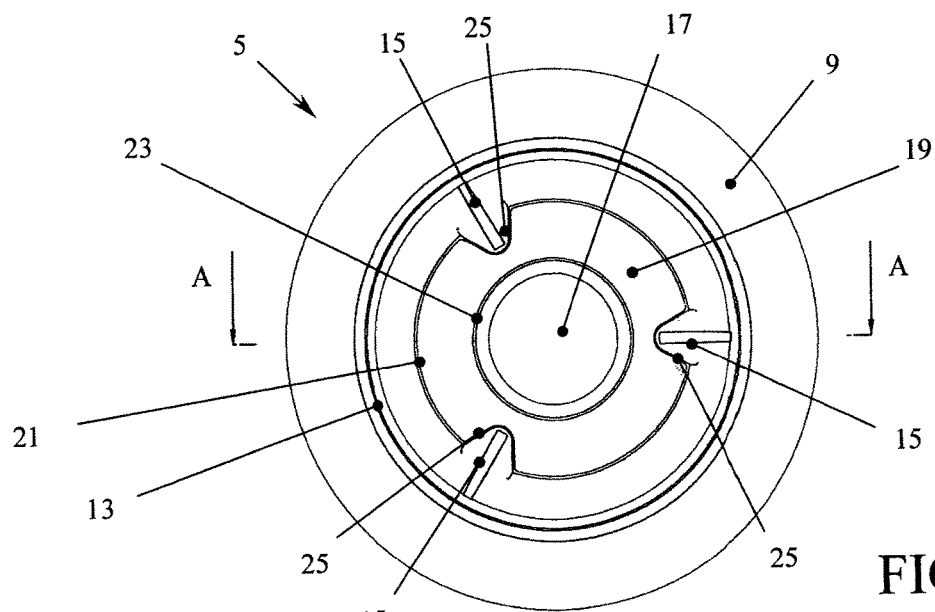
FIG. 3 shows a bottom plan view of the capsule of the present invention.
Figure 4A:
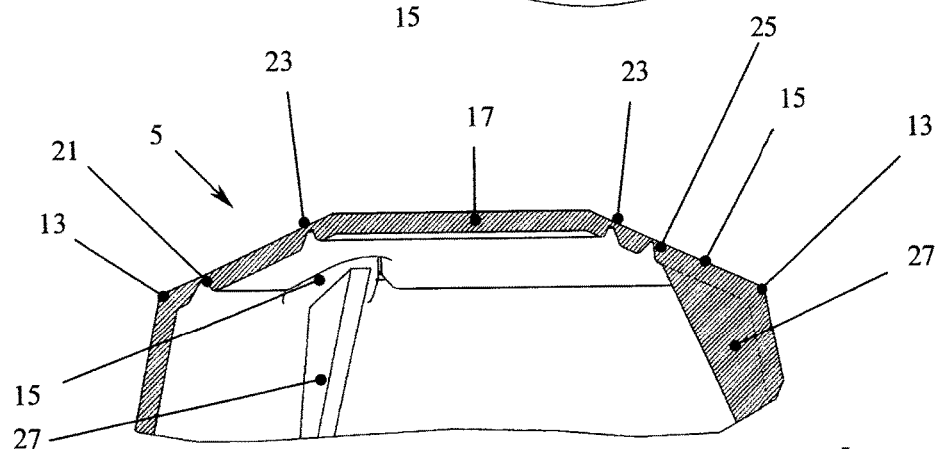
FIG. 4a shows a view along section line A-A of FIG. 3 of the first portion of the capsule of the present invention in a closed operating position.
Figure 4B:
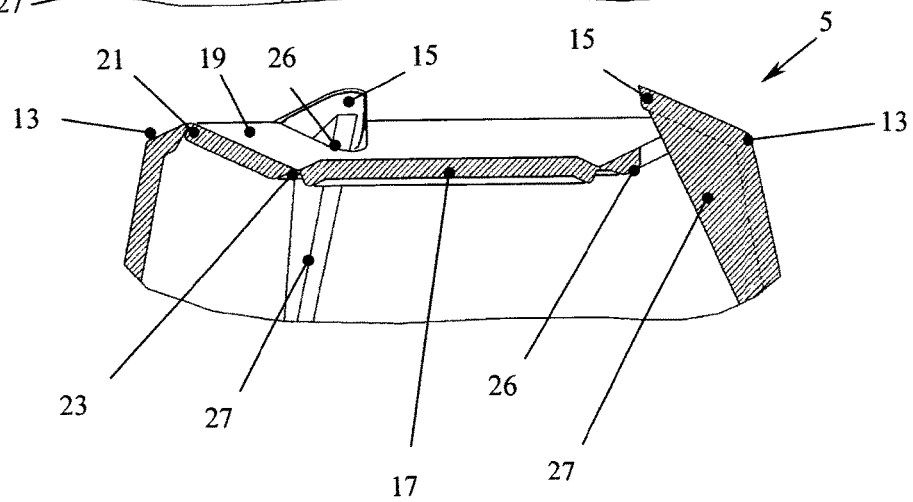
FIG. 4b shows a view along section line A-A of FIG. 3 of the first portion of the capsule of the present invention in a delivering operating position.
Figure 5A:
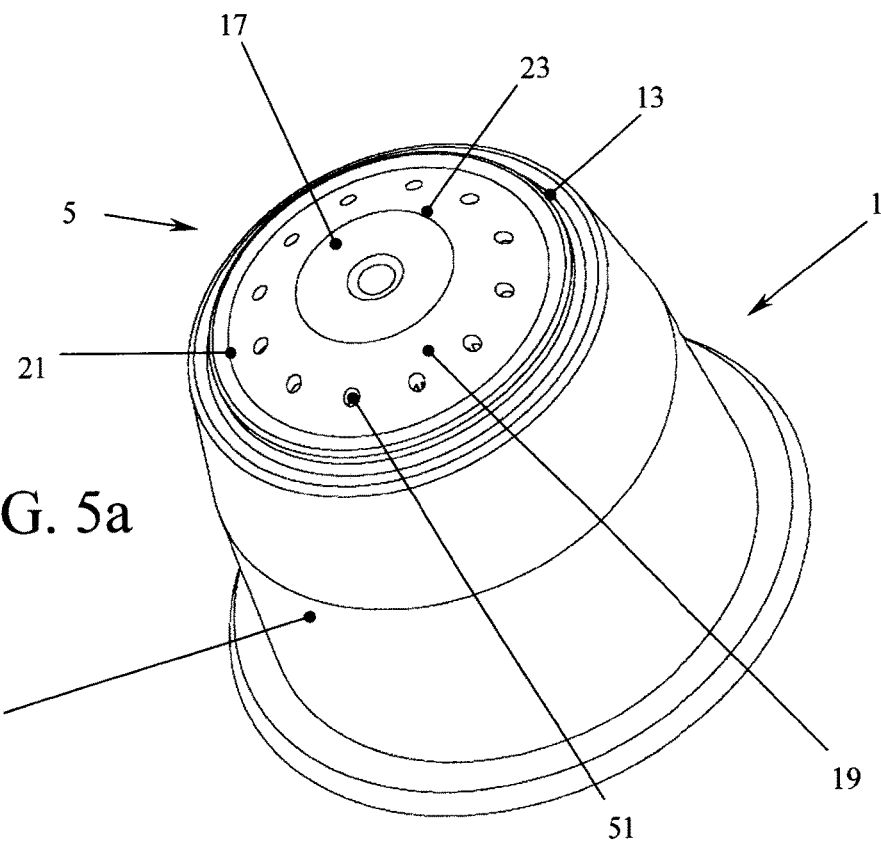
FIG. 5a shows a bottom perspective view of another preferred embodiment of the capsule of the present invention with its first portion in a closed operating position.
Figure 5B:
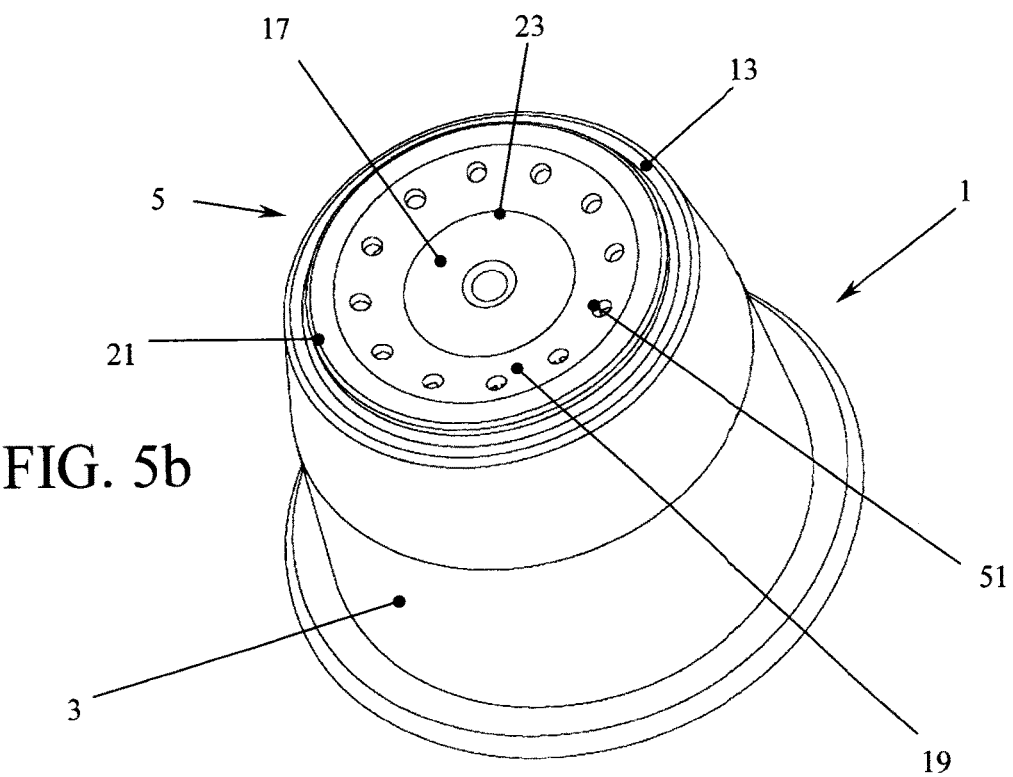
FIG. 5b shows a bottom perspective view of the capsule of FIG. 5a of the present invention with its first portion in a delivering operating position.
Figure 9A:
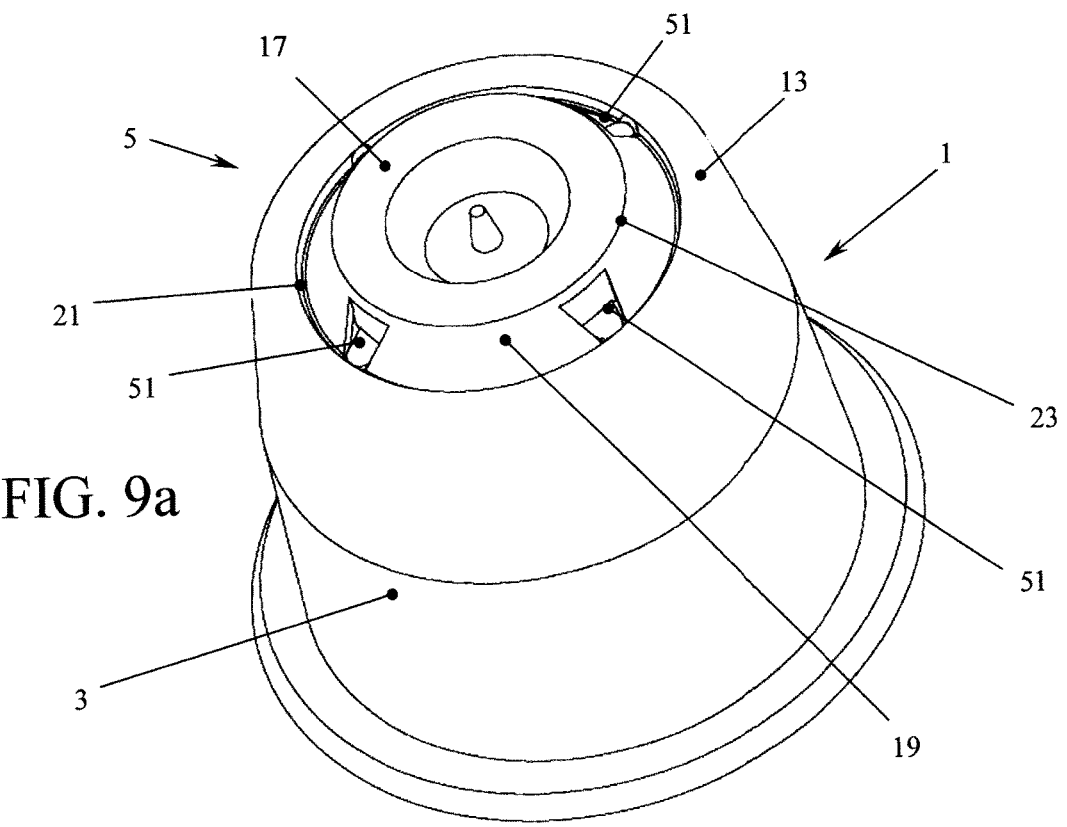
FIG. 9a shows a bottom perspective view of another preferred embodiment of the capsule of the present invention with its first portion in a closed operating position.
Figure 9B:
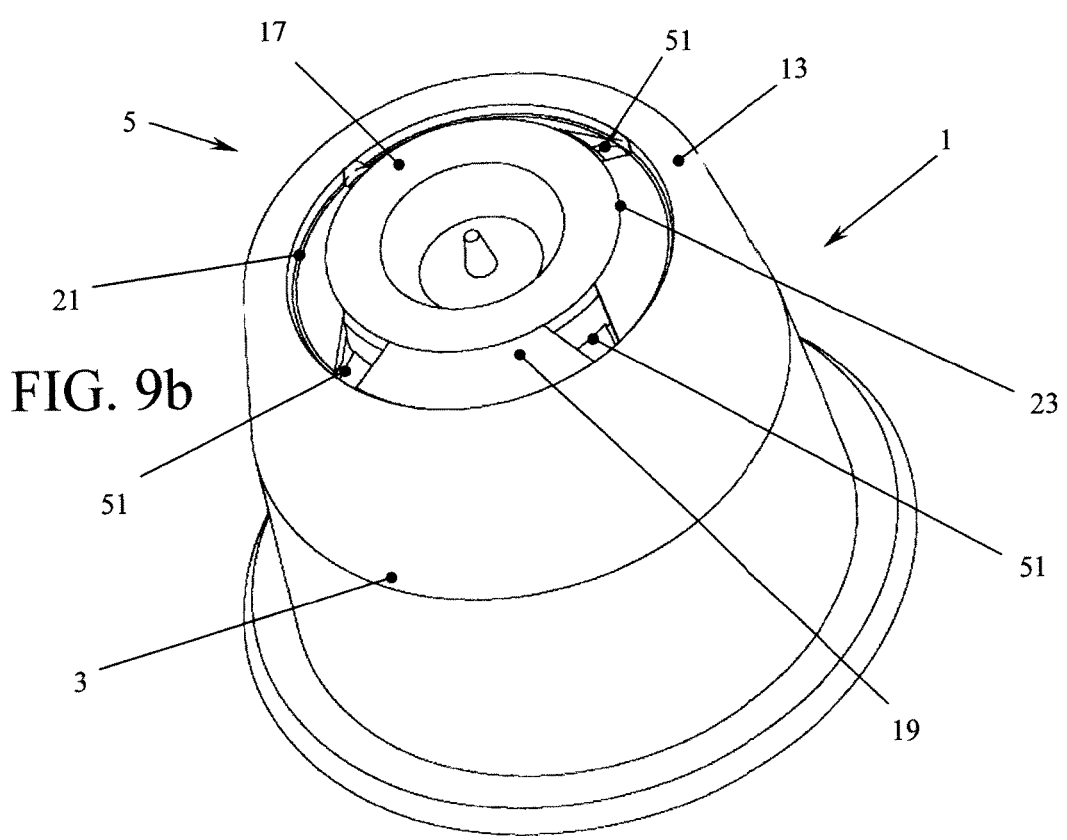
FIG. 9b shows a bottom perspective view of the capsule of FIG. 9a of the present invention with its first portion in a delivering operating position.
Figure 10:
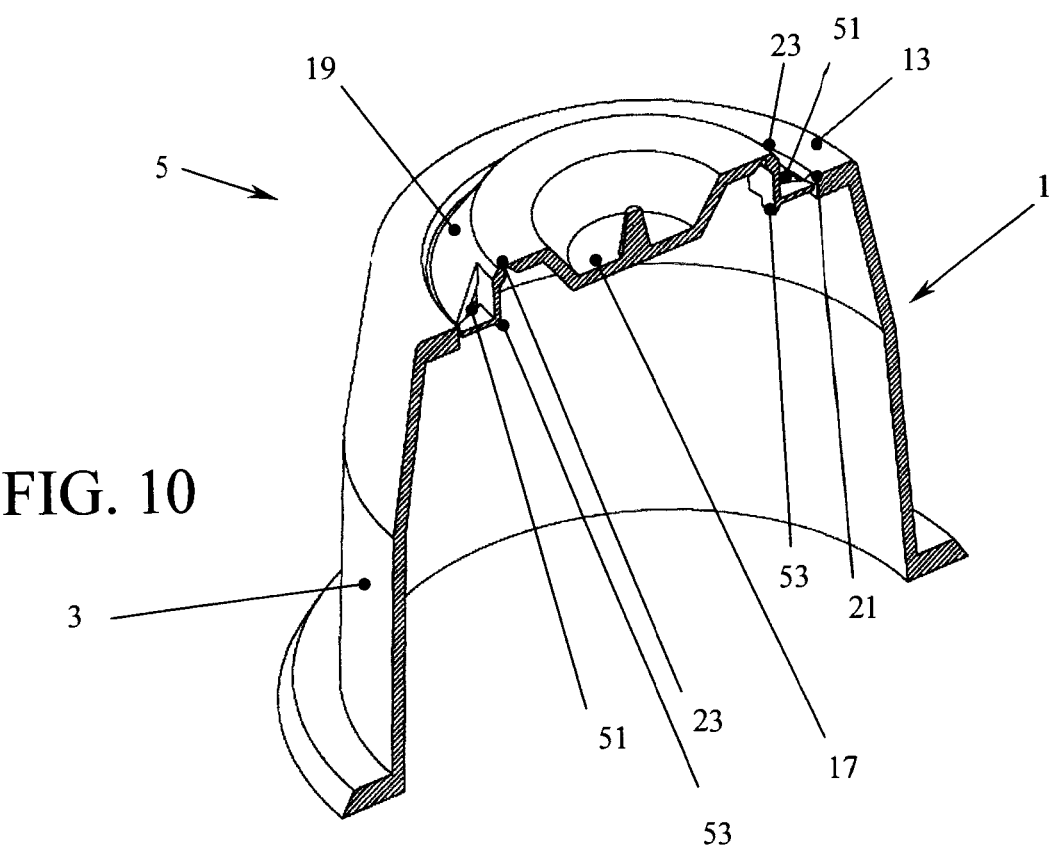
Figure 13A:
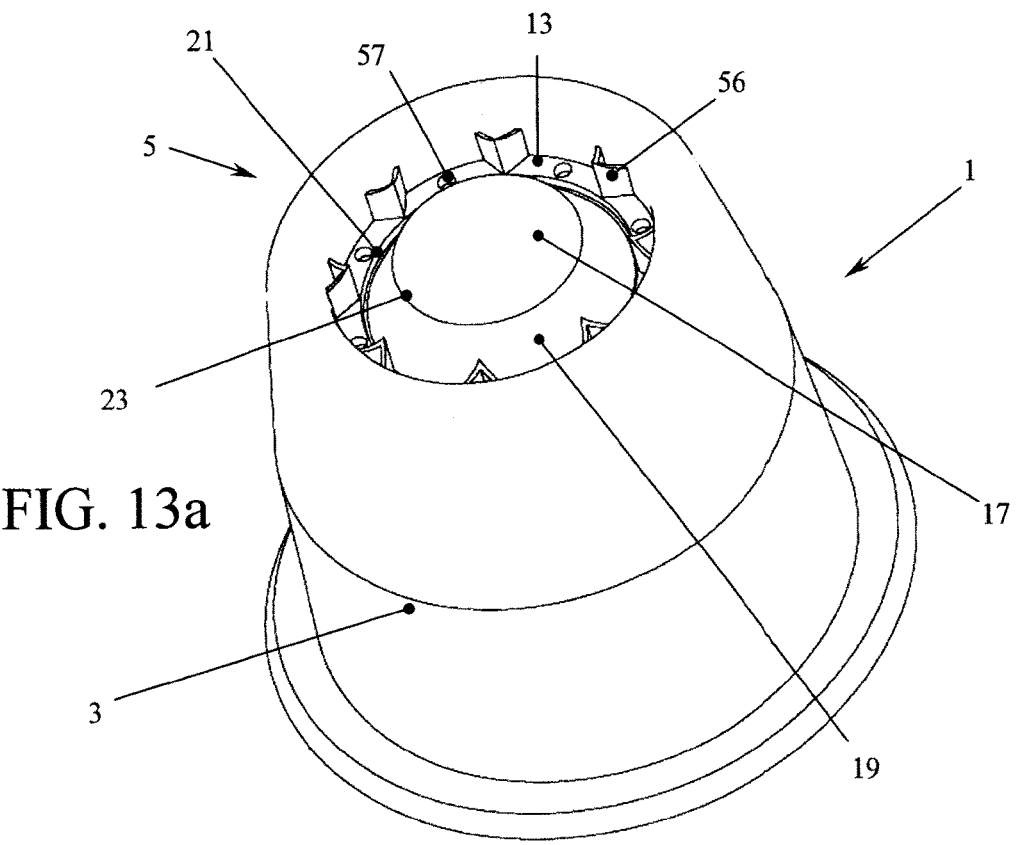
FIG. 13a shows a bottom perspective view of another preferred embodiment of the capsule of the present invention partially disassembled with its first portion in a closed operating position.
Figure 13B:
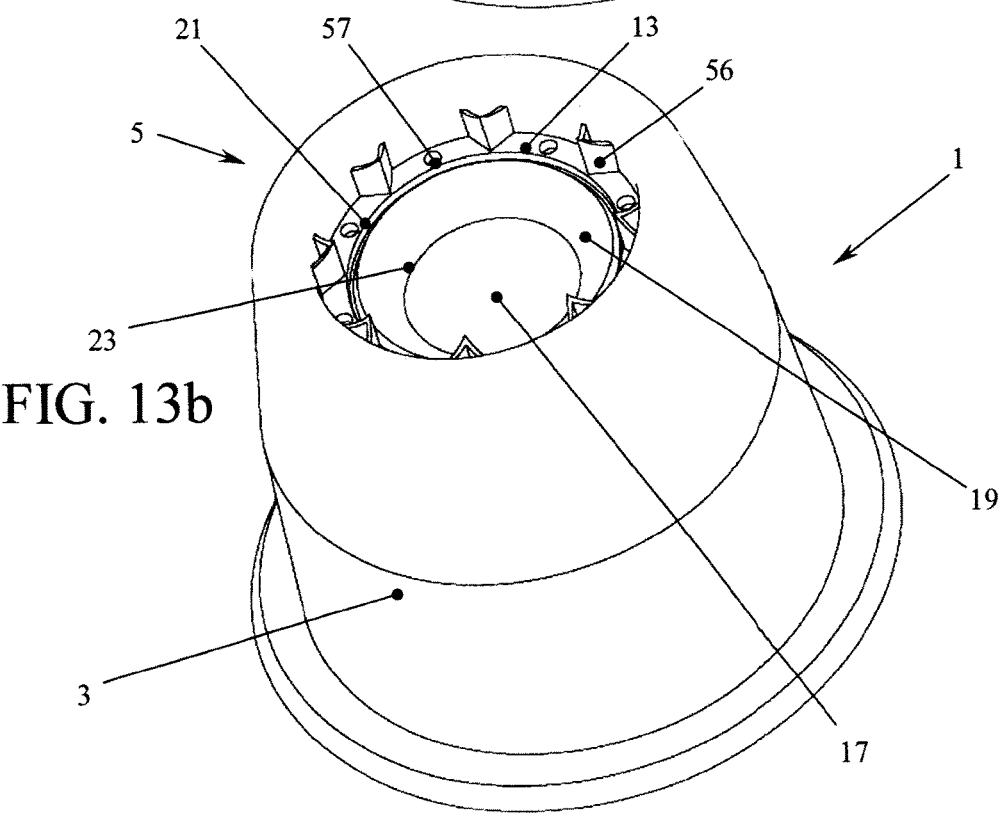
FIG. 13b shows a bottom perspective view of the capsule of FIG. 13a of the present invention partially disassembled with its first portion in a delivering operating position.
Figure 14A:
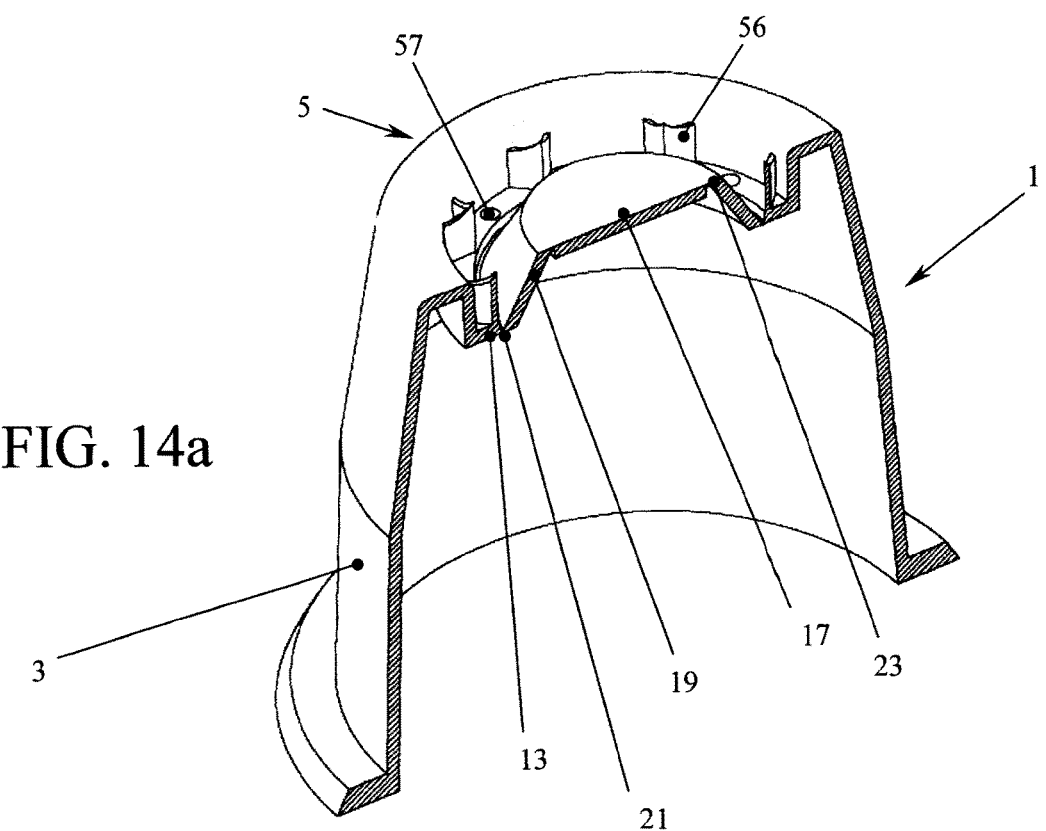
Figure 14B:
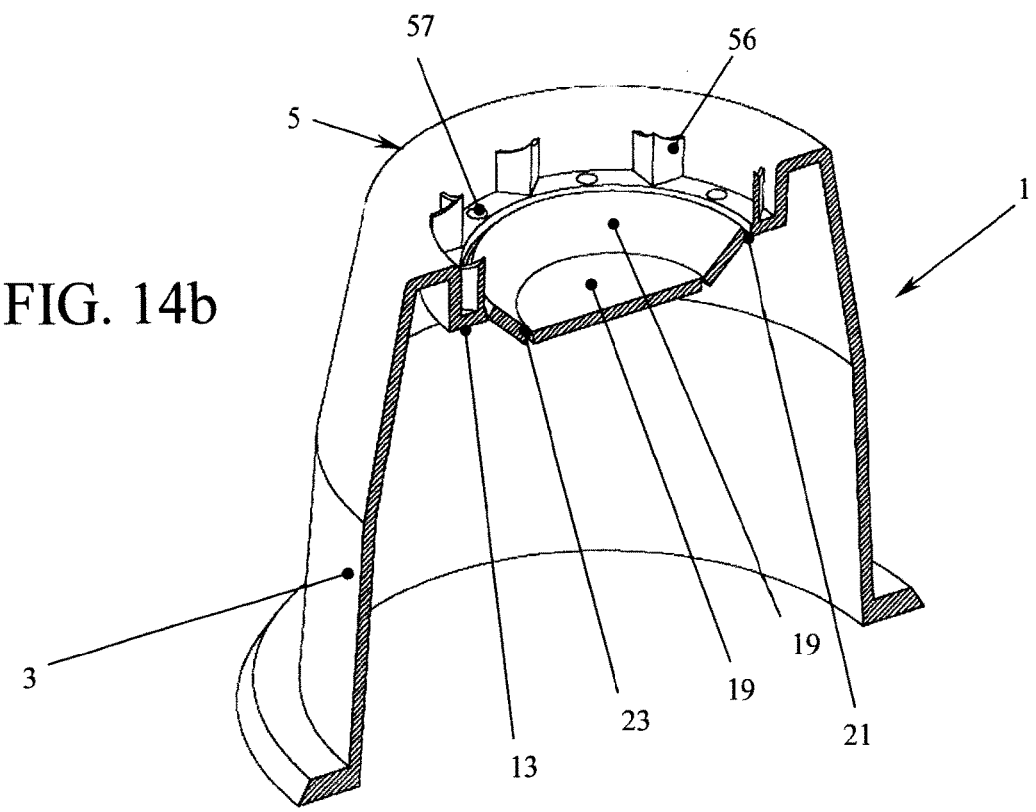
FIG. 14b shows a perspective and longitudinally section view of the capsule of the present invention in the delivering operating position of FIG. 13b.
Figure 16:
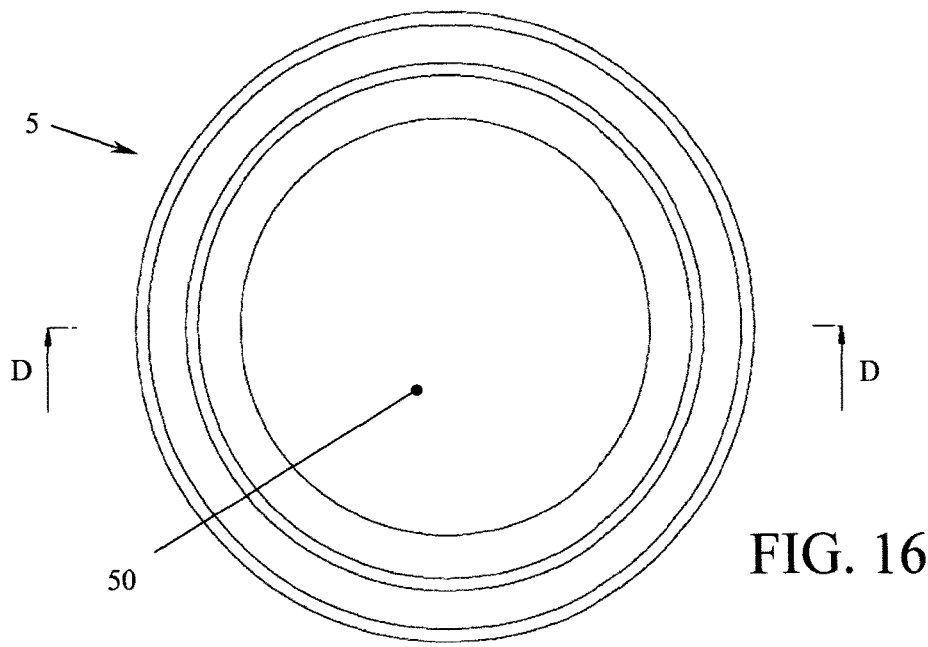
FIG. 16 shows a bottom plan view of the capsule of the present invention in FIGS. 15a and 15b.
Figure 17B:
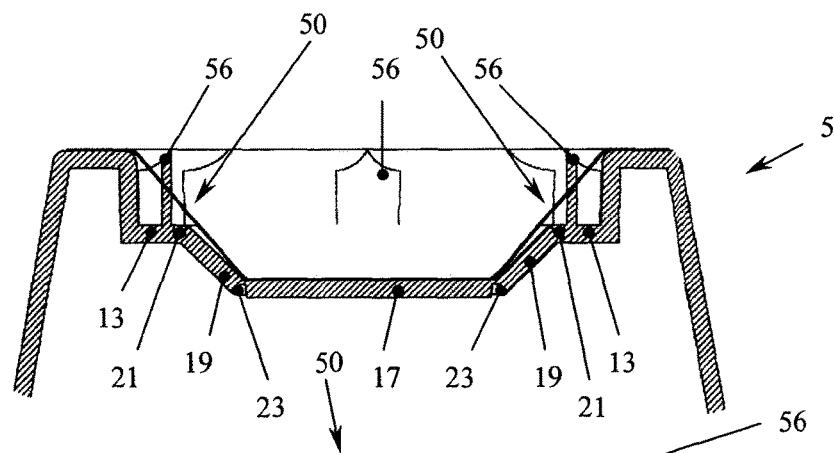
FIG. 17b shows a view along section line D-D of FIG. 16 of the first portion of the capsule of the present invention in a delivering operating position.
Figure 17A:
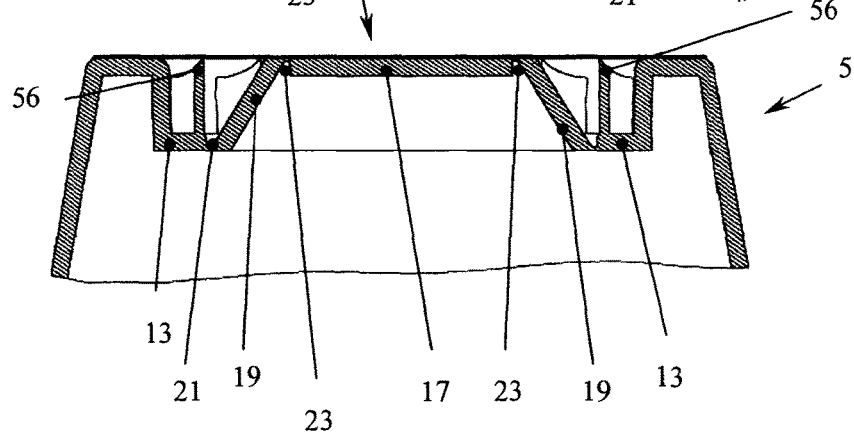
FIG. 17a shows a view along section line D-D of FIG. 16 of the first portion of the capsule of the present invention in a closed operating position.
Figure 18A:
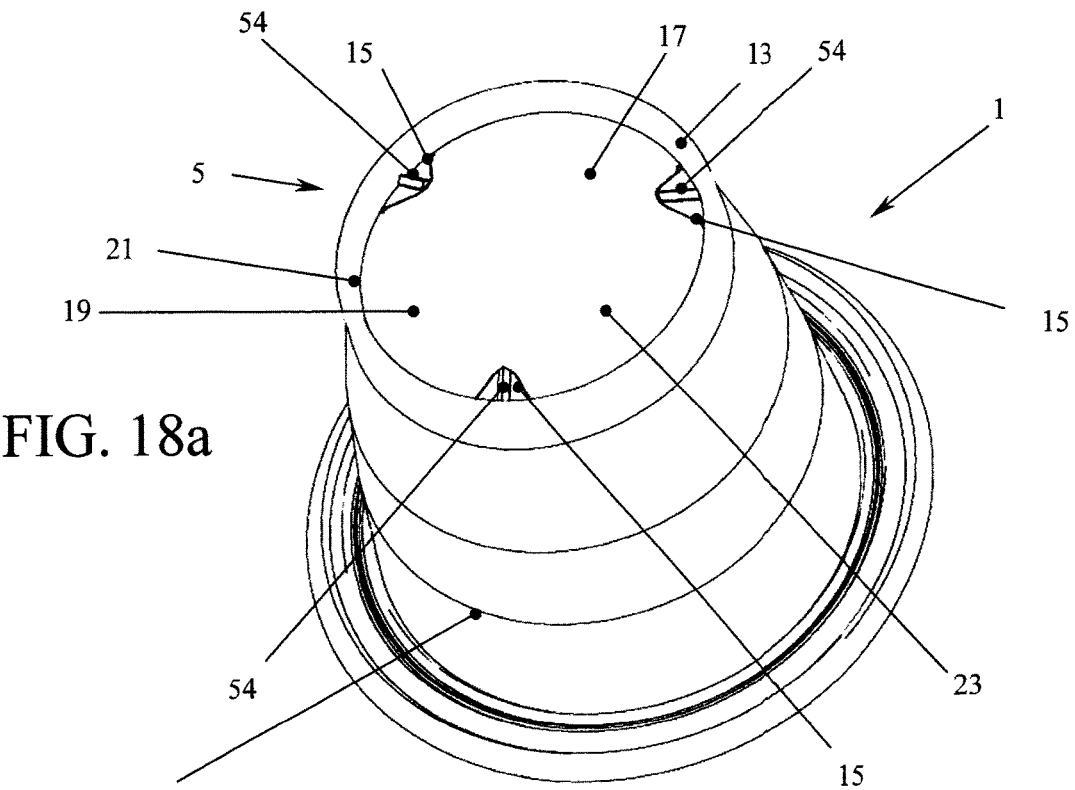
FIG. 18a shows a bottom perspective view of another preferred embodiment of the capsule of the present invention partially disassembled with the first portion in a closed operating position.
Figure 18B:
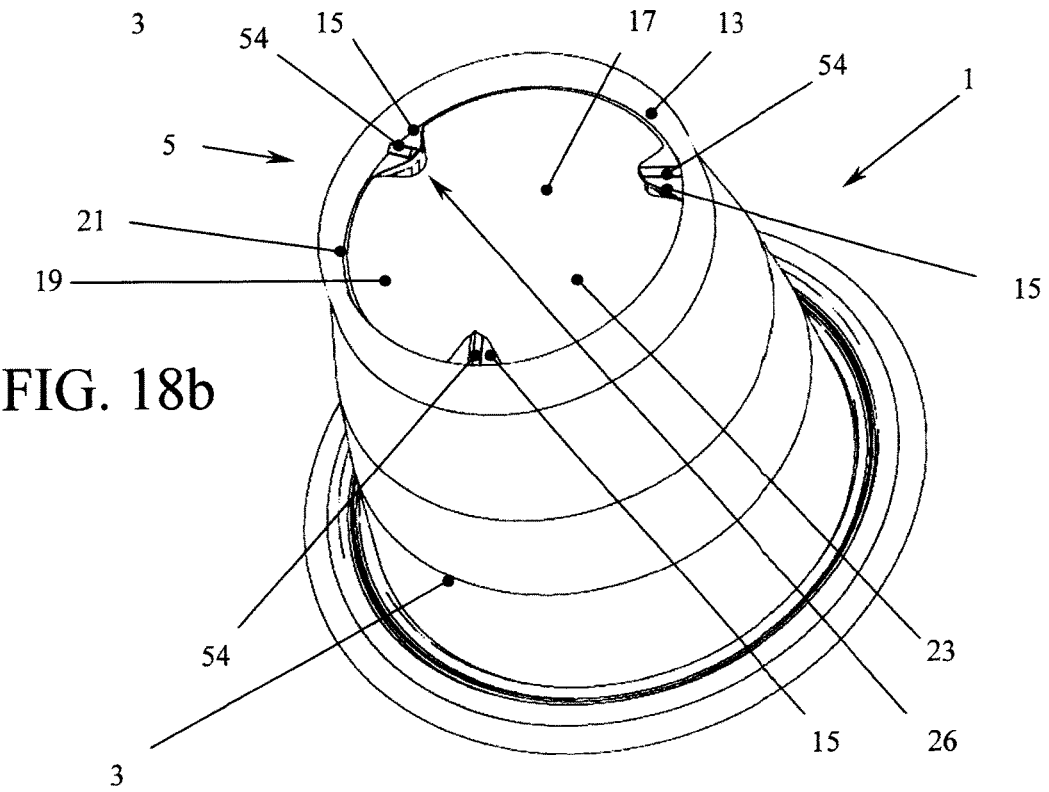
FIG. 18b shows a bottom perspective view of the capsule of FIG. 18a of the present invention partially disassembled with its first portion in a delivering operating position.
Figure 19A:
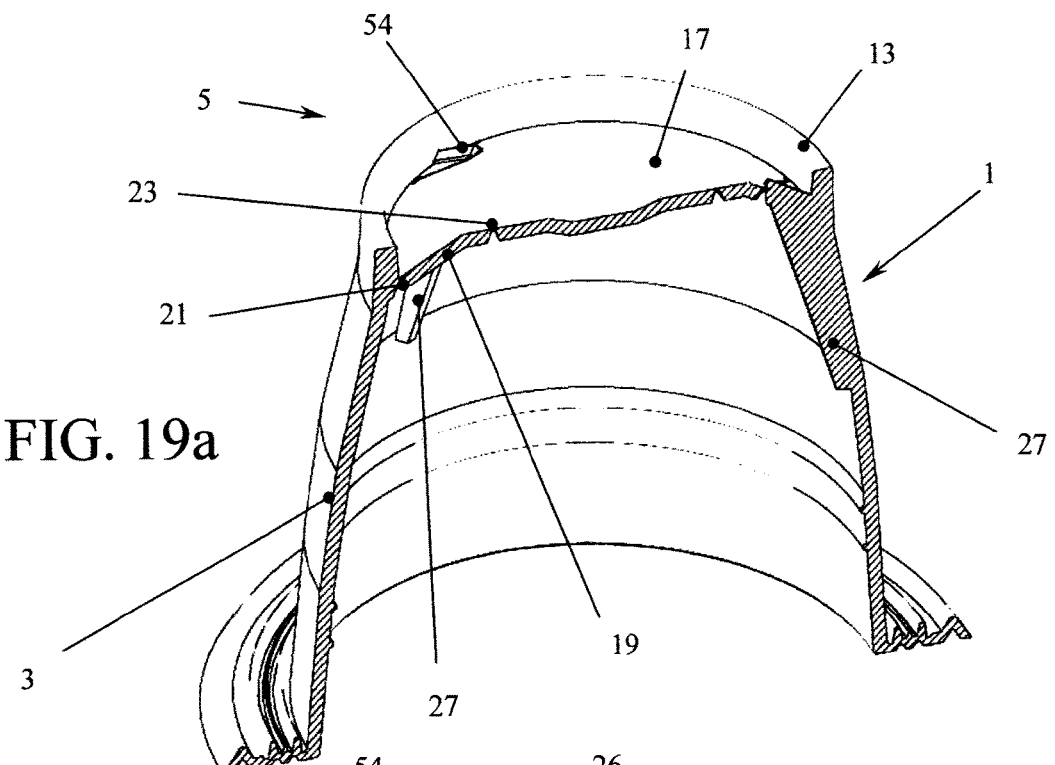
Figure 19B:
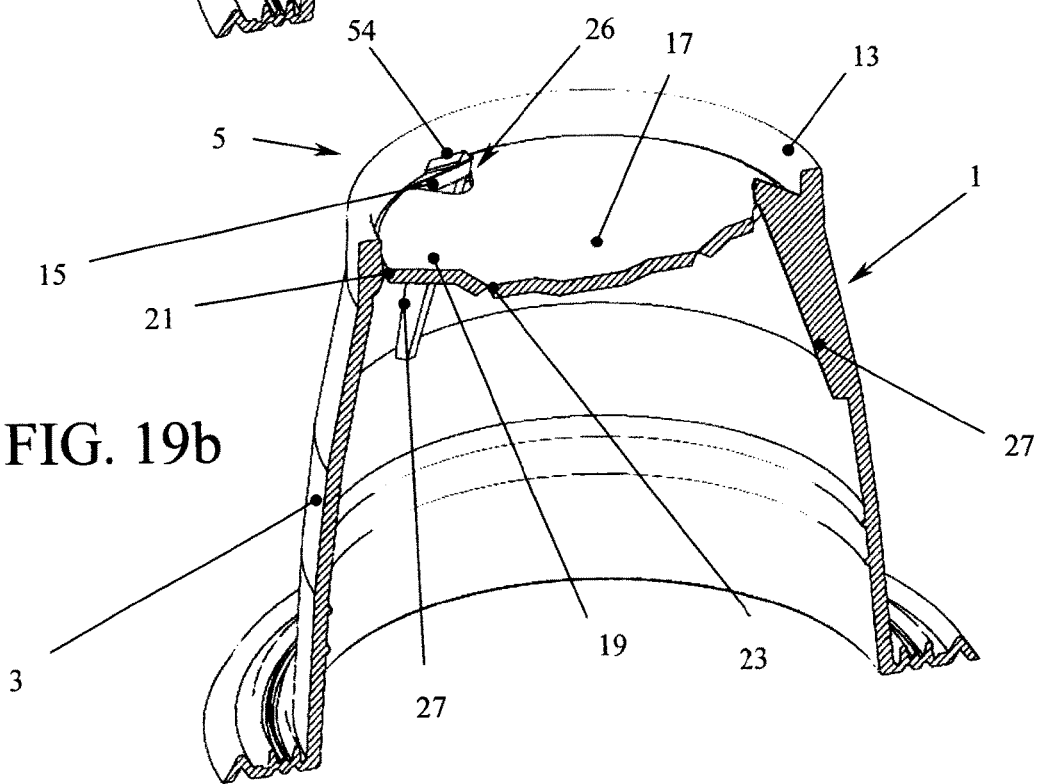
FIG. 19b shows a perspective and longitudinally sectioned view of the capsule of the present invention in the delivering operating position of FIG. 18b.
Figure 20A:
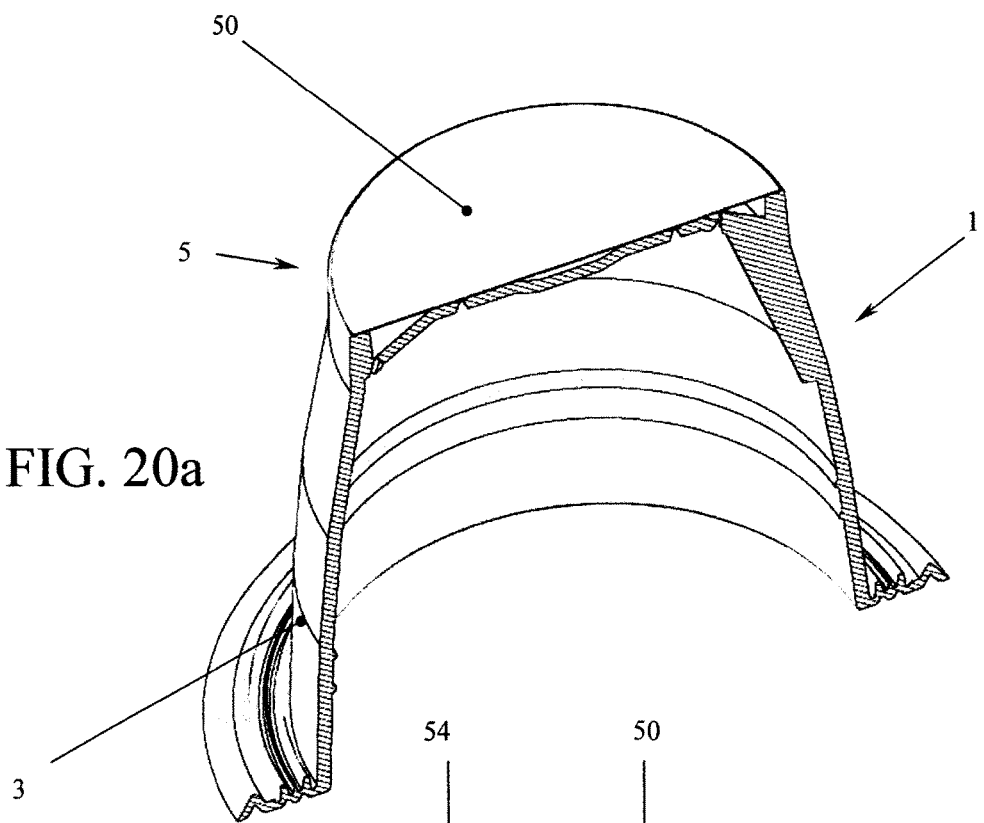
FIG. 20a shows a perspective and longitudinally sectioned view of the capsule of FIG. 19a assembled and in the closed operating position.
Figure 20B:
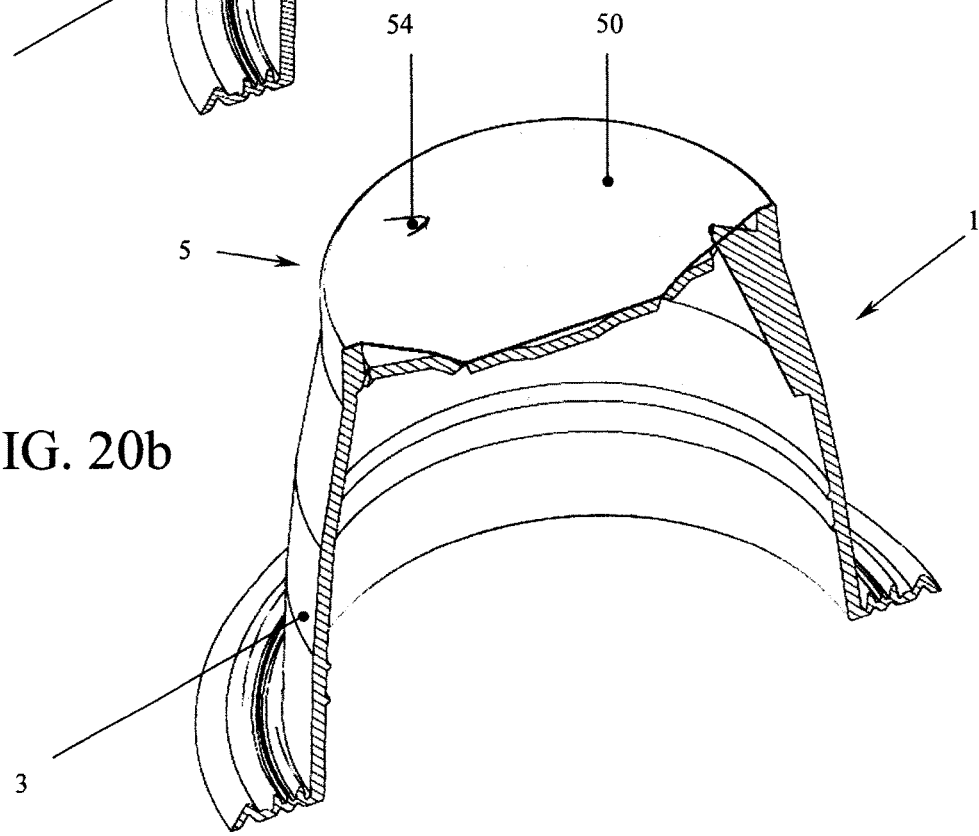
FIG. 20b shows a perspective and longitudinally sectioned view of the capsule of FIG. 19b assembled and in the delivering operating position.
Figure 21:
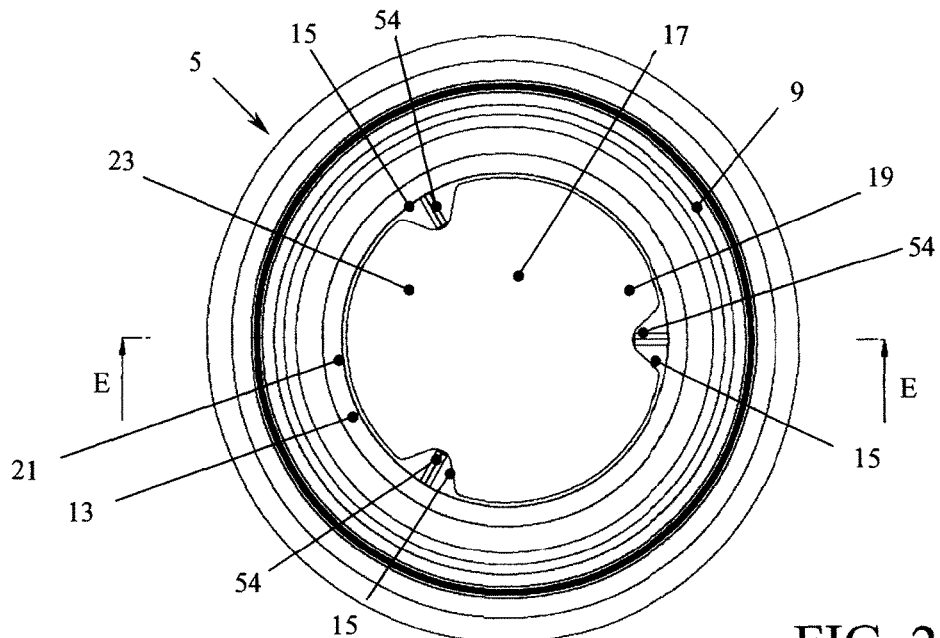
FIG. 21 shows a bottom plan view of the capsule of the present invention in FIGS. 19a and 19b.
Figure 22A:
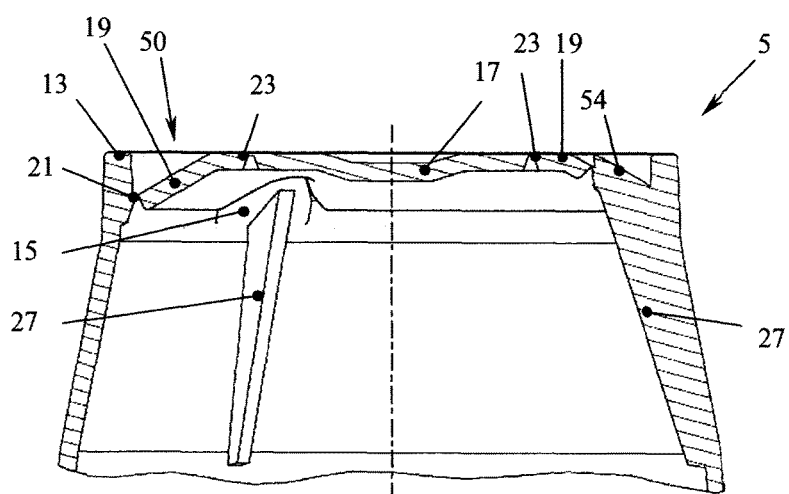
FIG. 22a shows a view along section line E-E of FIG. 21 of the first portion of the capsule of the present invention in a closed operating position.
Figure 22B:
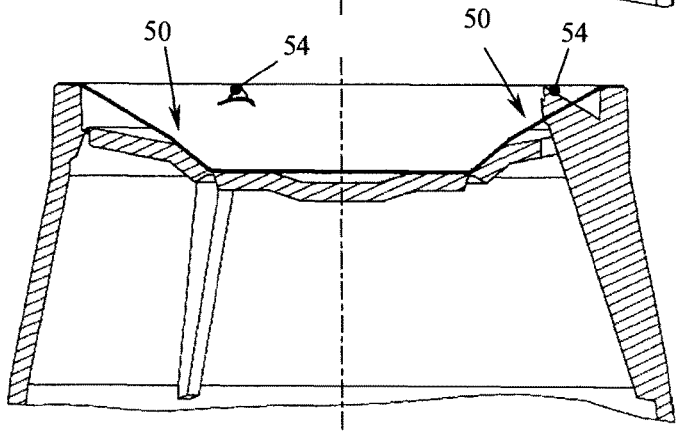
FIG. 22b shows a view along section line E-E of FIG. 21 of the first portion of the capsule of the present invention in a delivering operating position.
Figure 23:
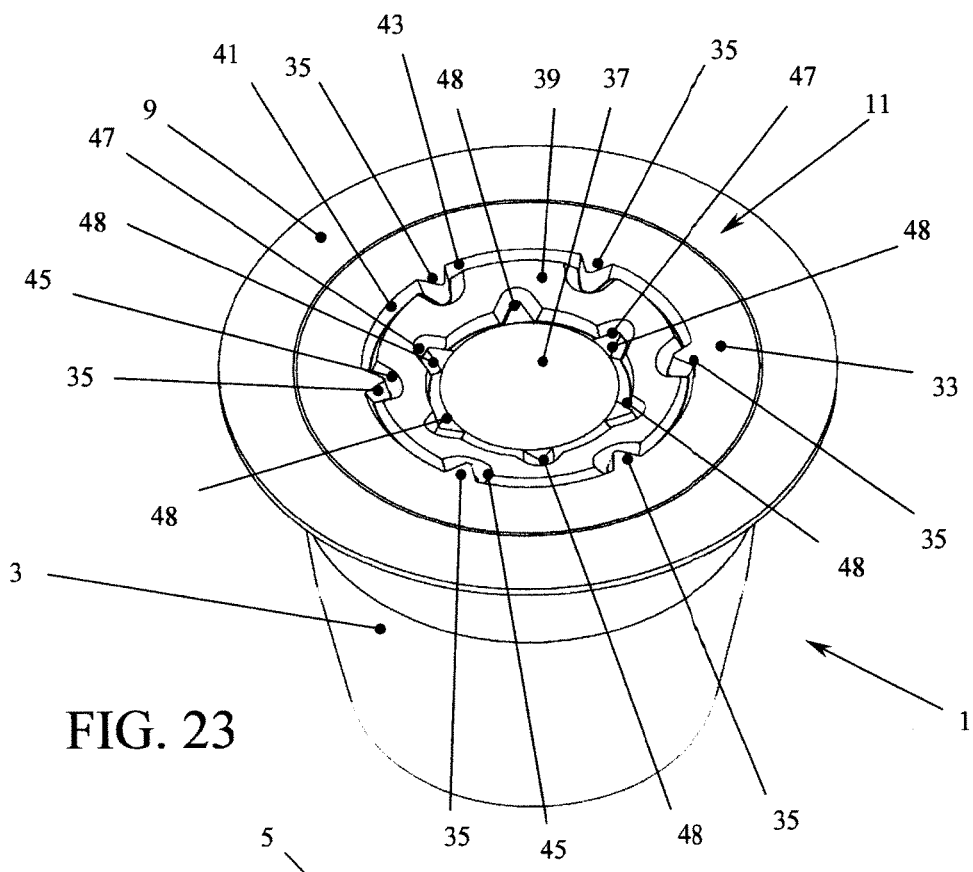
FIG. 23 shows a top perspective view of a preferred embodiment of the capsule of the present invention with a second portion in a closed operating position.
Figure 24:
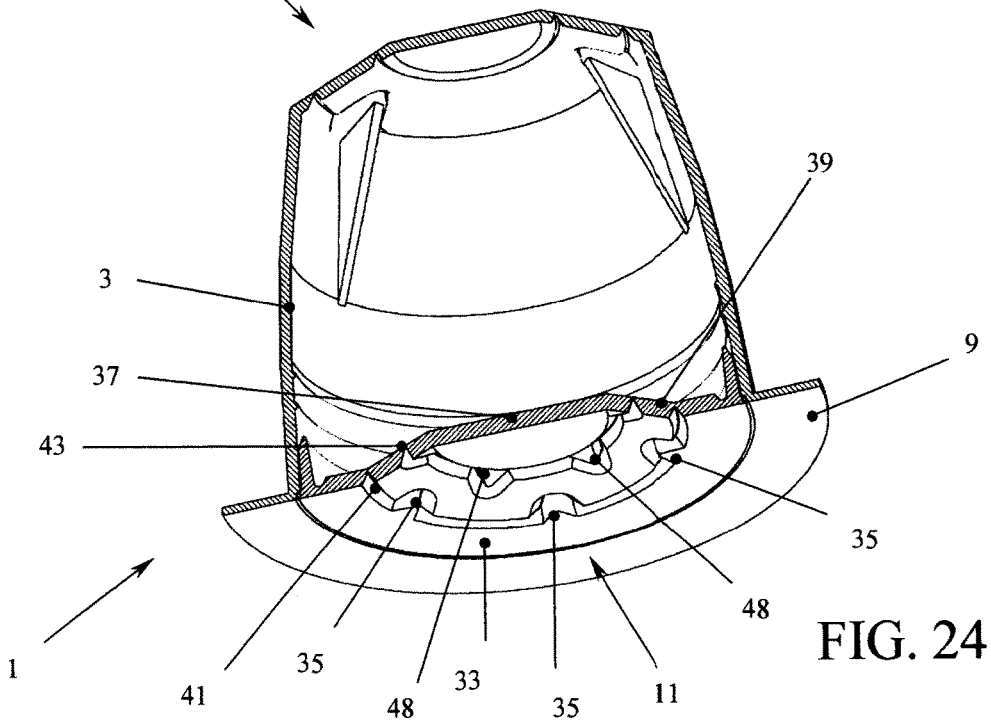
FIG. 24 shows a perspective and longitudinally sectioned view of the capsule of FIG. 23.
Figure 25:
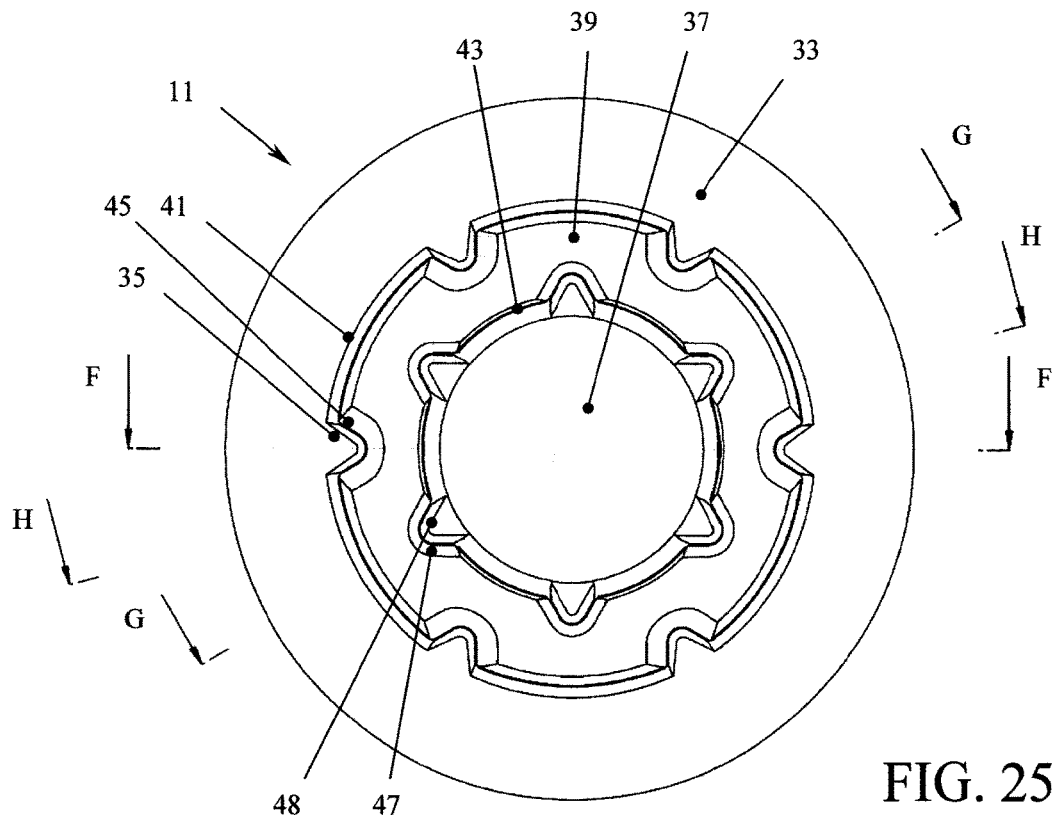
FIG. 25 shows a top plan view of the capsule of FIG. 23.
Figure 26A:
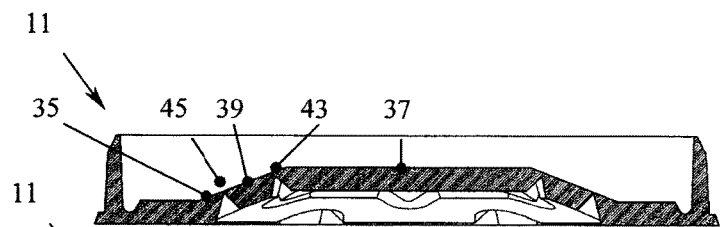
FIG. 26a shows a view along section line F-F of FIG. 25 of the second portion of the capsule of the present invention in a closed operating position.
Figure 26B:
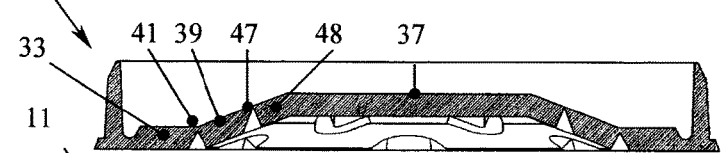
FIG. 26b shows a view along section line G-G of FIG. 25 of the second portion of the capsule of the present invention in a closed operating position.
Figure 26C:
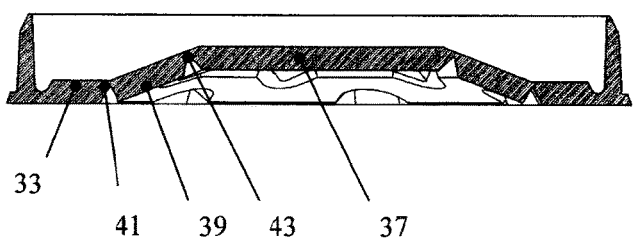
FIG. 26c shows a view along section line H-H of FIG. 25 of the second portion of the capsule of the present invention in a closed operating position.
Figure 27:
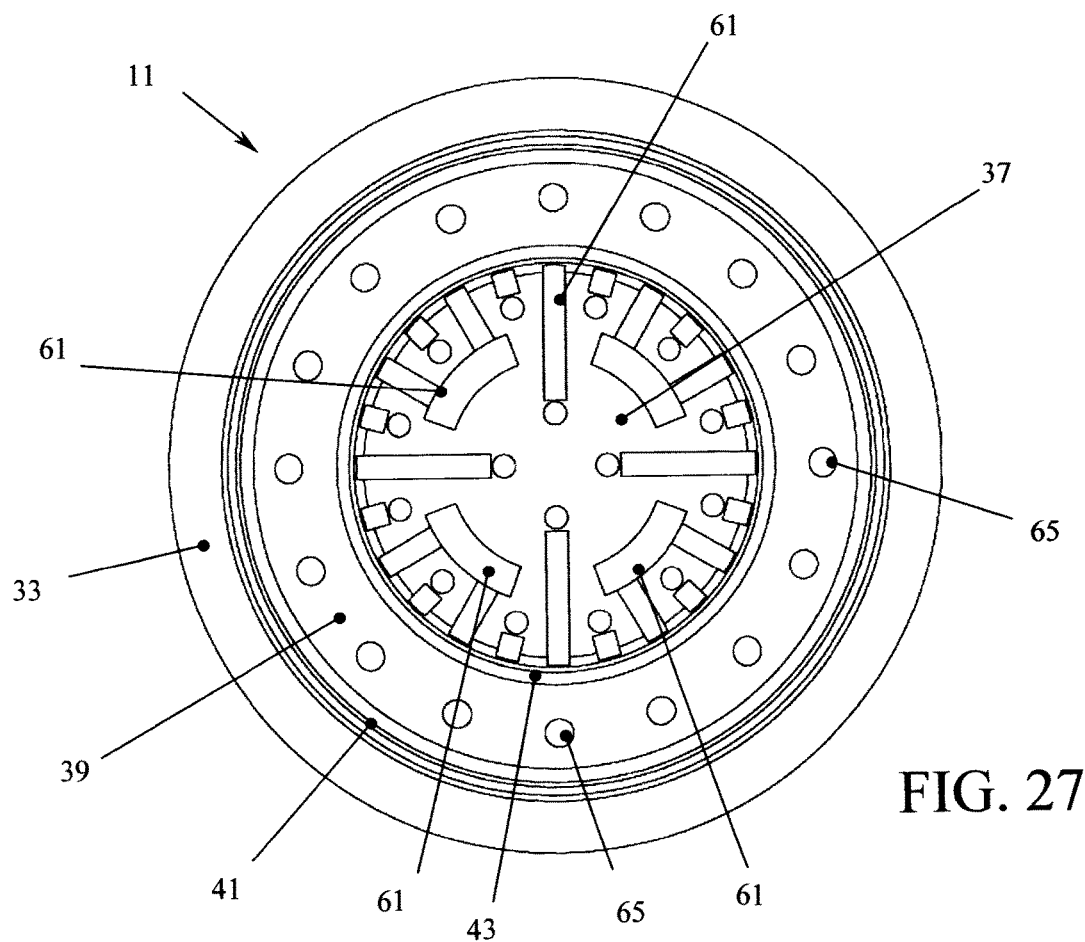
FIG. 27 shows a plan view of another preferred embodiment of the second portion of the capsule of the present invention.
Figure 28:
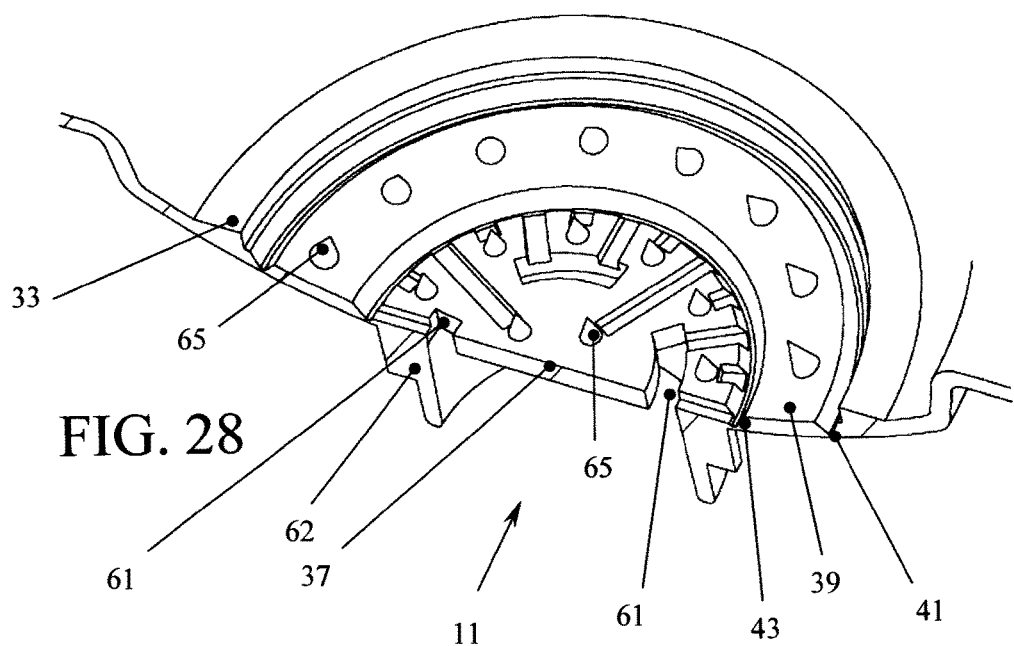
FIG. 28 shows a perspective and cross sectional view of the second portion of the capsule of FIG. 27.
Figure 29A:
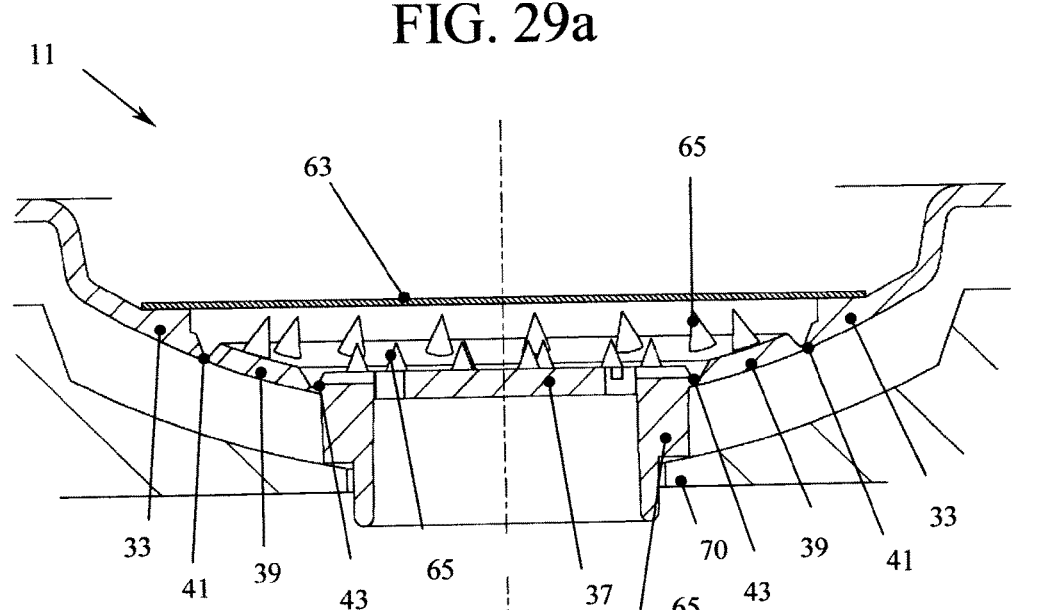
FIG. 29a shows a cross sectional view of the second portion of the capsule of FIG. 27 in the closed operating position.
Figure 29B:
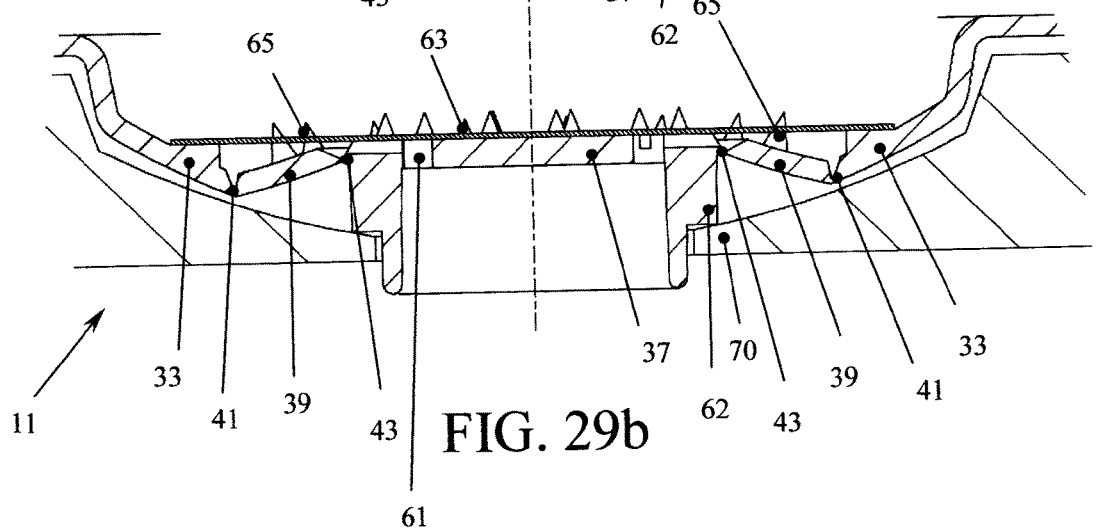
FIG. 29b shows a cross sectional view of the second portion of the capsule of FIG. 27 in the delivering operating position.
Figure 30A:
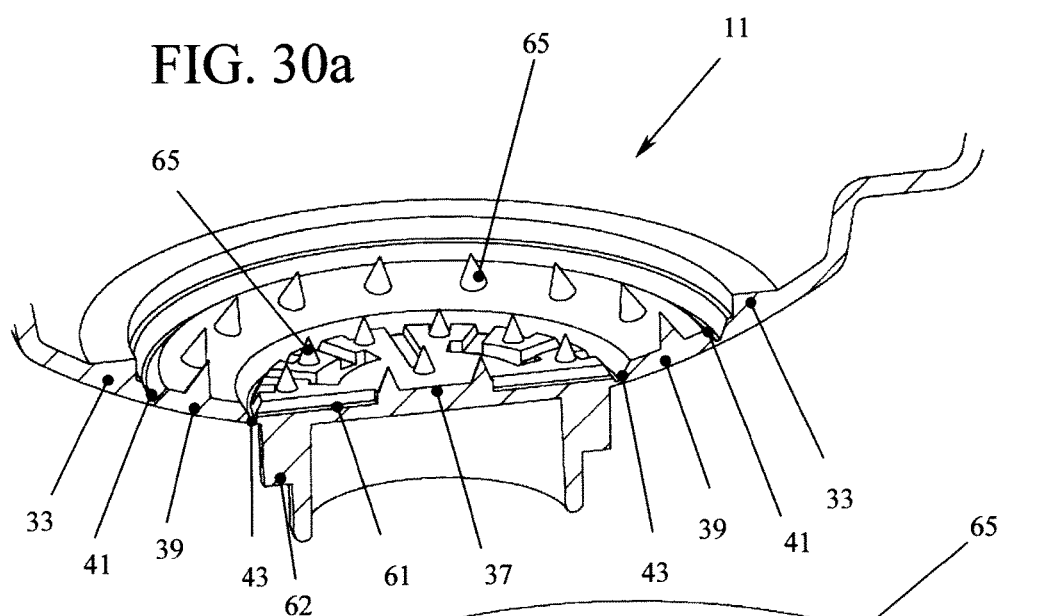
FIG. 30a shows a perspective and cross sectional view of the second portion of the capsule of FIG. 27 in the closed operating position.
Figure 30B:
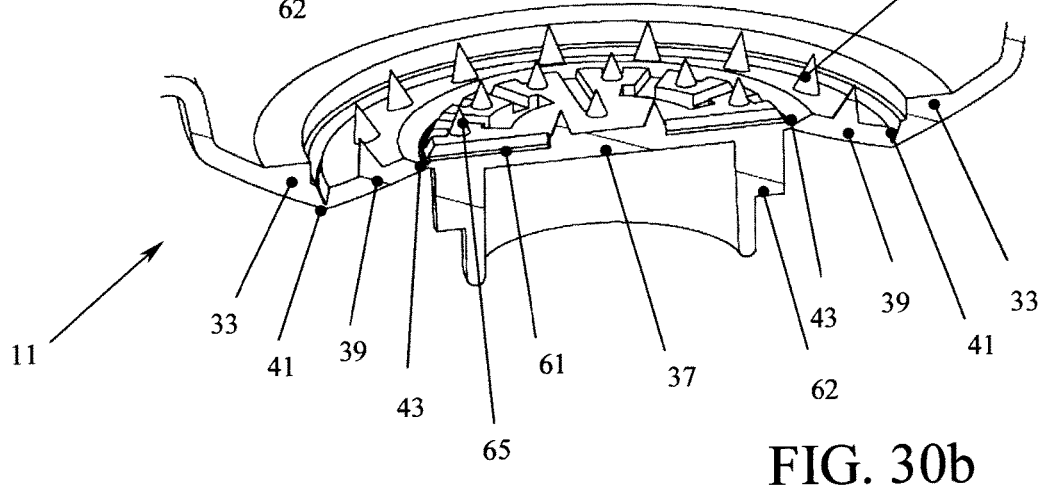
FIG. 30b shows a perspective and cross sectional view of the second portion of the capsule of FIG. 27 in the delivering operating position.

In addition, the capsule 1 according to the present invention could comprise at least one opening 6 opposite to the first portion 5 and adapted to be closed by at least one covering In a preferred embodiment thereof, like the one shown for example in FIG. 31, the covering comprises at least one layer of film 7 suitable to be perforated through known means of the preparing machine, as taught in the prior art, to allow the flow infusion beverage to go out through the perforation, the film 7 being welded or glued onto the perimeter edge 9 of the opening 6.

Alternatively or in addition, as it is possible to note in FIGS. 23 to 30b, the capsule 1 according to the present invention could comprise at least one second portion 11 for delivering the beverage from the containing body 3 toward outside, for example made as a plug inserted through the opening 6 or made integral with the containing body 3 itself, the second portion 11 being composed of:

at least one second, substantially rigid perimeter edge 33;
at least one second central portion 37;
at least one second crown portion 39 collapsible towards outside or inside the containing body 3 under the action of at least one pressing force, for example exerted by the above pressing means or by the flow of infusion beverage created inside the containing body 3 through the passage therein of the flow of fluid passing through the first passage openings 26 of the first portion 5 in its delivering operating position, mentioned above, to create one or more passageways of the flow from the internal volume towards outside the capsule 1 through the second portion 11, the second crown portion 39 being interposed between the second perimeter edge 33 and the second central portion 37, the second crown portion 39 being connected on its perimeter to the second perimeter edge 33 by interposing at least one third bending line 41 and being connected to the second central portion 37 by interposing at least one fourth bending line 43.

In the preferred embodiment of the capsule 1 according to the present invention shown in particular in FIGS. 23 to 26c, it is possible to note that the second perimeter edge 33 can be equipped with one or more second opening profiles 35, the second opening profiles 35 being preferably radially arranged along a circumference coaxial with a longitudinal axis of symmetry of the containing body 3. Moreover, the second central portion 37 can be equipped on its perimeter with one or more third opening profiles 48, also the third opening profiles 48 being preferably radially arranged along a circumference coaxial with a longitudinal axis of symmetry of the containing body 3. Moreover, each one of the second opening profiles 35 is connected to the second crown portion 39 by interposing at least one respective second programmed breaking line 45, at least one of the second programmed breaking lines 45 being adapted to be torn when the pressing force exerted by the flow of infusion beverage inside the containing body 3 on the second portion 11 reaches a predetermined value separating at least partially at least one of the second opening profiles 35 from the second crown portion 39. Moreover, if present, each of the third opening profiles 48 is connected to the second crown portion 39 by interposing at least one respective third programmed breaking line 47, also at least one of the third programmed breaking lines 47 being adapted to be torn when the pressing force exerted by the flow of infusion beverage inside the containing body 3 on the second portion 11 reaches a predetermined value, separating at least partially at least one of the third opening profiles 48 from the second crown portion 39.

Therefore, starting from the closed operating position of the second portion 11 of the capsule 1 according to the present invention shown in particular in FIGS. 23 to 26c, the pressing force exerted onto the second portion 11 itself by the flow of infusion beverage being created inside the containing body 3 through the passage therein of the flow of infusion water passing through the first passage openings 26 of the first portion 5 in its delivering operating position, mentioned above, brings the second crown portion 39 to collapse towards outside the volume of the containing body 3 by rotating, relative to the second perimeter edge and to the second central portion 37, respectively around the third bending line 41 and the fourth bending line 43, tearing the second programmed breaking lines 45, and, if present, the third programmed breaking lines 47, and separating the related second opening profiles 35, and, if present, the related third profiles 51, from the second crown portion 39, creating one or more flow passageways from the internal volume towards outside the capsule 1 through the second portion 11 and consequently taking the second portion 11 of the capsule 1 according to the present invention to a delivering operating position thereof (not shown): in fact, the above separation of the second opening profiles 35, and possibly of the third opening profiles 48, from the second crown portion 39 deriving from the collapse of the second crown portion 39 towards outside the containing body 3 deriving from the pressing force exerted by the flow of infusion beverage, creates, between at least one of the second profiles 35, and possibly of the third profiles 48, and the second crown portion 39, respective third and possibly fourth passage openings which communicate the internal volume of the containing body 3 with outside the capsule 1, the second portion 11 consequently enabling the passage of the infusion beverage from inside the containing body 3 towards outside the capsule 1, going out through the second and third openings.

In another of the preferred embodiments of the capsule 1 according to the present invention, like the one shown in particular in FIGS. 27 to 30b, the second portion 11 is equipped with one or more fifth passage openings 61 adapted to communicate the internal volume of the containing body 3 with outside the capsule 1, the fifth passage openings 61 being preferably arranged on the second central portion 37. Moreover, the second central portion 37 is externally equipped with at least one abutment means 62, made preferably as one or more fins or at least one circular collet, adapted to abut against the delivery portion 70 of the seat of the preparing machine suitable to house the capsule 1 for preparing the beverage. Moreover, the capsule 1 according to the present invention is equipped with at least one second internal covering layer 63, made for example as at least one protecting aluminium layer, interposed between the second portion 11 and the internal volume of the containing body 3, at least the surface of the second central portion 37 and possibly the surface of the second crown portion 39 facing towards the internal volume of the containing body 3, and in particular towards the second internal covering layer 63, being equipped with one or more second breaking means 65, preferably comprising a plurality of tips (like, for example, in the embodiment of the capsule 1 according to the present invention of FIGS. 27 to 30b) or cutting profiles, the second breaking means 65 being adapted to perforate and/or tear the second internal covering layer 63 when the pressing force exerted by the pressing means acting, through the abutment means 62 against the delivery portion 70, at least onto the second perimeter edge 33 reaches a predetermined value to obtain the passageways through the second portion 11 and take the second portion 11 itself from the closed operating position, like the one shown in FIGS. 28, 29a, 30a, towards the delivering operating position, like the one shown in particular in FIGS. 29b, 30b, communicating the internal volume of the containing body 3 with outside the capsule 1 through the fifth passage opening(s) 61 and the perforations/tearings made by the second breaking means 65 through the second internal covering layer 63. Therefore, starting from the closed operating position of the second portion 11 of the capsule 1 according to the present invention, due to the pressing force exerted at least onto the second perimeter edge 33 by the pressing means of the preparing machine and the abutment opposition of the abutment means 62 against the related delivery portion 70 of the related seat inside which the capsule 1 is inserted, the second crown portion 39 is taken to collapse inside the volume of the containing body 3 by rotating, related to the second perimeter edge 33 and to the second central portion 37, respectively around the third bending line 41 and the fourth bending line 43, taking the second breaking means 65 to penetrate through the second internal covering layer 65, reaching the delivering operating position in order to consequently enable the passage of the infusion beverage from the internal volume of the containing body 3 outside the capsule 1 through the perforations/tearings made by the second breaking means 65 and the fifth passage opening(s) 61.

Also in this case, preferably, the third and fourth bending lines 41, 43 and the second and third programmed breaking lines 45 and 47 are made as striction lines of the material, typically plastics, composing the second portion 11 of the capsule 1 according to the present invention.

As further variation, and to avoid that aromas of the substance to be infused contained in the containing body 3 of the capsule 1 get dispersed, impairing the quality of the beverage, it is possible to provide that the plug 11 itself is also covered by at least one layer of film, welded or glued to the perimeter edge of the opening, the film being then adapted to be removed before using the capsule 1.

What is claimed is:

1. A capsule for preparing a beverage comprising a single integral piece containing body having a first portion for introducing a fluid inside the containing body, the first portion forming a first opening profile by interposing a programmed breaking line, the containing body defining at least one internal volume adapted to contain at least one substance for preparing the beverage, and a stiffening rib disposed within the containing body, adjacent to and supporting the first opening profile, wherein the first portion further comprises:
   a perimeter edge portion;
   a central portion; and
   a crown portion interposed between the perimeter edge portion and the central portion;
   wherein the crown portion is connected on its perimeter to the perimeter edge portion by interposing a first bending line, and wherein the crown portion is connected to the central portion by interposing a second bending line;
   and
   wherein the first portion is configured such that when a pressing force is exerted by a pressing means of a preparing machine of the beverage onto the central portion and/or onto the crown portion, the crown portion collapses inside the volume of the containing body rotating, relative to the perimeter edge portion and to the central portion, around the first bending line and the second bending line, the stiffening rib keeping the first profile in a substantially fixed position and causing the programmed breaking line to be torn, and separating at least partially the first opening profile from the crown portion, in order to make, between the first opening profile and the crown portion, a first passage opening between the outside of the capsule and the internal volume of the containing body.

2. The capsule of claim 1, wherein the central portion is of a circular shape coaxial with a longitudinal axis of symmetry of the containing body.

3. The capsule of claim 2, further comprising a covering layer interposed between the outside of the capsule and the central portion and the crown portion, the first opening profile being equipped with a cutting, perforating or breaking profile oriented to perforate and/or tear the covering layer when the pressing means of the preparing machine exerts the pressing force.

4. The capsule of claim 2, further comprising additional opening profiles supported by respective stiffening ribs.

5. The capsule of claim 2, further including second passage openings radially arranged on the crown portion.

6. The capsule of claim 3, further comprising a plurality of first opening profiles and wherein the cutting, perforating or breaking profile comprises a plurality of tips or cutting profiles arranged next to passage openings.

7. The capsule of claim 1, wherein the containing body forms an opening opposite to the first portion and further comprising a covering over the opening, the covering comprising at least one layer of film adapted to be perforated.

8. The capsule of claim 1, further comprising a plurality of first opening profiles and wherein the first opening profiles are radially arranged along a circumference coaxial with a longitudinal axis of symmetry of the containing body.

9. The capsule of claim 1, further comprising a covering layer interposed between the outside of the capsule and the central portion and the crown portion, the first opening profile being equipped with a cutting, perforating or breaking profile oriented to perforate and/or tear the covering layer when the pressing means of the preparing machine exerts the pressing force.

10. The capsule of claim 1, further comprising additional opening profiles supported by a respective stiffening ribs.

11. The capsule of claim 10, further including second passage openings radially arranged on the crown portion.

12. The capsule of claim 9, wherein the cutting, perforating or breaking profile comprises a plurality of tips or cutting profiles, each one of the tips or cutting profiles being arranged next to a related passage opening.

13. The capsule of claim 1 wherein the first bending line is constructed to have decreased thickness in comparison with adjacent crown portion material and adjacent perimeter edge portion material.

14. The capsule of claim 1 wherein the second bending line is constructed to have decreased thickness in comparison with adjacent central portion material and adjacent crown portion material.

15. The capsule of claim 14 wherein the first bending line is constructed to have decreased thickness in comparison with adjacent crown portion material and adjacent perimeter edge portion material.

* * * * *